US007848296B2

(12) United States Patent
Lee et al.

(10) Patent No.: US 7,848,296 B2
(45) Date of Patent: Dec. 7, 2010

(54) APPARATUS AND METHOD FOR GENERATING CHANNEL INFORMATION AND APPARATUS AND METHOD FOR ADAPTIVE TRANSMISSION EMPLOYING THE SAME

(75) Inventors: Hee-Soo Lee, Daejon (KR); Jae-Young Ahn, Daejon (KR); Young-Jo Ko, Daejon (KR); Du-Ho Rhee, Seoul (KR); Kwang-Soon Kim, Seoul (KR)

(73) Assignees: Electronics and Telecommunications Research Institute, Daejon (KR); Industry-Academic Cooperation Foundation, Yonsei University, Seoul (KR)

( * ) Notice: Subject to any disclaimer, the term of this patent is extended or adjusted under 35 U.S.C. 154(b) by 1167 days.

(21) Appl. No.: 11/438,667

(22) Filed: May 23, 2006

(65) Prior Publication Data

US 2007/0099577 A1 May 3, 2007

(30) Foreign Application Priority Data

Aug. 19, 2005 (KR) .................. 10-2005-0076504
Dec. 15, 2005 (KR) .................. 10-2005-0123940

(51) Int. Cl.
*H04Q 7/00* (2006.01)
(52) U.S. Cl. ...................... 370/332; 455/450
(58) Field of Classification Search ......... 370/331–333; 455/266, 267, 422.1, 436, 442, 443, 447, 455/450, 452, 522, 525, 67.1
See application file for complete search history.

(56) References Cited

U.S. PATENT DOCUMENTS

| 5,305,468 | A  | * | 4/1994  | Bruckert et al. | ............. 455/522 |
| 6,374,085 | B1 | * | 4/2002  | Saints et al.   | .................. 455/69 |
| 6,473,467 | B1 |   | 10/2002 | Wallace et al.  |                      |
| 6,553,534 | B2 |   | 4/2003  | Yonge, III et al. |                    |
| 2003/0013454 | A1 | * | 1/2003 | Hunzinger      | .................. 455/452 |
| 2005/0250502 | A1 | * | 11/2005 | Laroia et al. | ................. 455/447 |
| 2006/0019679 | A1 | * | 1/2006  | Rappaport et al. | ....... 455/456.5 |

OTHER PUBLICATIONS

Sorour Falahati et al.; "Adaptive Modulation Systems for Predicted Wireless Channels"; IEEE Transactions on Communications, vol. 52; No. 2; Feb. 2004; pp. 307-316.

(Continued)

*Primary Examiner*—Ricky Ngo
*Assistant Examiner*—Phuongchau B Nguyen
(74) *Attorney, Agent, or Firm*—Lowe Hauptman Ham & Berner LLP

(57) ABSTRACT

Provided are an apparatus and method for generating channel information and apparatus and method for adaptive transmission employing the same. The channel information generation apparatus comprises an estimator for estimating current channel information of a multi-carrier received signal for each path, a short-period channel information generator for predicting channel information after a predetermined minimum transmission delay time based on the current channel information estimated by the estimator to generate short-period channel information, and a long-period channel information generator for deriving statistic information of error between the channel information predicted by the short-period channel information generator and actual channel information at the time of transmission to produce long-period channel information. The invention is applied to mobile communication systems using multi-carrier.

10 Claims, 19 Drawing Sheets

OTHER PUBLICATIONS

Alexandra Duel-Hallen et al.; "Long-Range Prediction of Fading Signals"; IEEE Signal Processing Magazine; May 2000; pp. 62-75.

Duho Rhee et al.; "An Adaptive Modulation and Coding Technique for Downlink MIMO Systems on Flat Rayleigh Fading Channels with CSI Feedback Delay"; Proceedings of 2005 Fall General Conference; vol. 32; pp. 1-4.

Duho Rhee et al.; "Adaptive Modulation and Coding on Rayleigh Multipath Fading Channels Using Channel Prediction"; Proceedings of IEEK Fall Conference 2005; pp. 65-68.

\* cited by examiner

APPARATUS AND METHOD FOR GENERATING CHANNEL INFORMATION AND APPARATUS AND METHOD FOR ADAPTIVE TRANSMISSION EMPLOYING THE SAME

FIELD OF THE INVENTION

The present invention relates to an apparatus and method for generating channel information and apparatus and method for adaptive transmission employing the same. More particularly, the invention is directed to a channel information generation apparatus and method for predicting a future channel by a minimum transmission delay time by considering a channel change according to the passage of time and generating channel information using the predicted value as well as statistic information of an error of the predicted value at a terminal to transmit them to a base station when the terminal generates and transmits the channel information to an uplink and the base station performs an adaptation transmission using it in a mobile communication system where the uplink and a downlink employ different frequency bands. And also, the invention relates to an apparatus and method for adaptive transmission capable of improving the performance and capacity of mobile communication system by computing a transmission power necessary for each transmission scheme that satisfies a target packet error rate using channel information and statistic information of an error from a terminal and efficiently conducting an adaptation transmission based on the same at a base station when a channel change exists according to the passage of time.

DESCRIPTION OF RELATED ART

FIG. 1 shows a diagram for describing a general adaptive transmission scheme in a mobile communication system using a single carrier.

As shown in FIG. 1, in the mobile communication system using general frequency division multiple access, a pilot or preamble 130 is sent from a transmission end 100 to a reception end 110 via a wireless channel 120. At the reception end 110, a demodulation is first made by a demodulation and decoding unit 140 using the pilot or preamble; and a Signal to Noise Ratio (SNR) 160 is measured by an SNR measurer 150 and then feedbacked to the transmission end 100. Next, a modulation scheme, a coding scheme, and a transmission power allocation are adaptively decided at a modulation and coding scheme decider 170 based on the SNR 160 provided from the reception end 110. And then, traffic data 190 is adaptively processed and sent by a coding and modulation unit 180 with the decided coding and modulation schemes, thereby enhancing the performance and capacity of the system.

In the conventional method, however, the time the SNR is measured by the reception end 110 is different from an actual time of transmission; and therefore, the channel at the actual transmission time is unlike the channel when the SNR is measured.

To solve the above problem, a prediction technique is developed to predict a channel at the time of transmission. This will be explained below with reference to FIG. 2.

FIG. 2 provides a diagram for describing a general adaptive transmission scheme in a mobile communication system using multi-carrier.

As provided therein, at a reception end 210, a future channel value is predicted by utilizing channel information received up to date and then feedbacked to a transmission end 200. Then, at the transmission end 200, an adaptive transmission is carried out on the basis of the predicted information wherein other operations are done in the same manner as FIG. 1. This prediction technique is proposed in, e.g., A. Duel-Hallen et al., "Long-range Prediction of Fading Signals," *IEEE Signal Processing*, vol. 17, pp. 62-75, May 2000.

However, the prior art prediction technique as noted above simply compensates only an error or difference between the predicted SNR and a target SNR to decide a transmission power, thereby causing a considerable decrease of the system performance since the predicted channel value involves a predictive error.

Another scheme is suggested for deriving a reception bit error rate by taking account of statistic characteristics of predicted channel value and then calculating a transmission power using it to remedy the above deficiency. This scheme is disclosed in S. Falahati et al., "Adaptive Modulation Systems for Predicted Wireless Channels," *IEEE Trans. Comm.*, vol. 52, pp 307-316, February 2004.

However, this scheme deals with only an instance where a single user performs an adaptive transmission under flat fading environments in a single-carrier system. Therefore, it may be difficult to apply the scheme to communication systems that are under various channel environments, and combine with terminals using various channel information generation algorithms and various mobile objects' speeds.

SUMMARY OF THE INVENTION

It is, therefore, an object of the present invention to provide a channel information generation apparatus and method for generating short-period channel information by predicting a channel and also creating long-period channel information using statistic characteristic of prediction error at a terminal.

Another object of the invention is to offer an apparatus and method for adaptive transmission for performing an adaptive transmission employing short-period channel information and long-period channel information provided from a terminal at a base station.

The other objectives and advantages of the invention will be understood by the following description and will also be appreciated by the embodiments of the invention more clearly. Further, the objectives and advantages of the invention will readily be seen that they can be realized by the means and its combination specified in the claims.

In accordance with one aspect of the present invention, there is provided an apparatus for generating channel information, comprising: an estimation means for estimating current channel information of a multi-carrier received signal for each path; a short-period channel information generation means for predicting channel information after a predetermined minimum transmission delay time based on the current channel information estimated by the estimation means to generate short-period channel information; and a long-period channel information generation means for deriving statistic information of error between the channel information predicted by the short-period channel information generation means and actual channel information at the time of transmission to produce long-period channel information.

In accordance with another aspect of the present invention, there is provided a method for generating channel information, comprising the steps of: (a) receiving a pilot transmitted with a predetermined transmission power; (b) estimating current channel information for each path using the received pilot; (c) predicting channel information after a predetermined minimum transmission delay time based on the estimated current channel information to generate short-period channel information; and (d) deriving statistic information of error between the predicted channel information predicted and actual channel information at the time of transmission to produce long-period channel information.

In accordance with still another aspect of the present invention, there is provided an adaptive transmission apparatus comprising: a storage means for storing a target average SNR and a target packet error rate for each modulation/coding scheme; a transmission power decision means for deciding a transmission power for each user and each modulation/coding scheme depending on short-period channel information and long-period channel information from each terminal and the information stored in the storage means; a scheduling means for selecting users based on the transmission power necessary for each user and each modulation/coding scheme decided by the transmission power decision means and deciding a modulation/coding scheme for each user; and a coding/modulation/transmission means for coding user traffic data using the decided coding scheme for each user selected at the scheduling means, and modulating and transmitting the data with the decided modulation scheme.

In accordance with a further aspect of the present invention, there is provided an adaptive transmission apparatus comprising: a storage means for storing transmission powers that are obtained by quantizing a predetermined range of short-period channel information and long-period channel information; a transmission power decision means for deciding a transmission power for each user and each modulation/coding scheme corresponding to the short-period channel information and the long-period channel information from each terminal on the basis of the information stored in the storage means; a scheduling means for selecting users based on the transmission power necessary for each user and each modulation/coding scheme decided by the transmission power decision means and deciding a modulation/coding scheme for each user; and a coding/modulation/transmission means for coding user traffic data using the decided coding scheme for each user selected at the scheduling means, and modulating and transmitting the data with the decided modulation scheme.

In accordance with a still further aspect of the present invention, there is provided an adaptive transmission apparatus comprising: a storage means for storing a target average SNR and a target packet error rate for each modulation and coding scheme; a user selection means for selecting users based on short-period channel information and long-period channel information provided from each terminal; a transmission power decision means for deciding a transmission power for each modulating/coding scheme for each user selected by the user selection means depending on the short-period channel information and the long-period channel information from each terminal and the information stored in the storage means; a scheduling means for deciding a modulation/coding scheme for each user based on the transmission power necessary for each user and each modulation/coding scheme decided by the transmission power decision means; and a coding/modulation/transmission means for coding user traffic data using the decided coding scheme for the user selected at the user selection means, and modulating and transmitting the data with the decided modulation scheme.

In accordance with another aspect of the present invention, there is provided an adaptive transmission apparatus comprising: a storage means for storing transmission powers that are obtained by quantizing a predetermined range of short-period channel information and long-period channel information; a user selection means for selecting users based on short-period channel information and long-period channel information provided from each terminal; a transmission power decision means for searching the information stored in the storage means depending on the short-period channel information and the long-period channel information from each terminal and deciding a transmission power for each modulating/coding scheme for each user selected by the user selection means; a scheduling means for deciding a modulation/coding mode for each user based on the transmission power necessary for each user and each modulation/coding scheme decided by the transmission power decision means; and a coding/modulation/transmission means for coding user traffic data using the decided coding scheme for each user selected at the scheduling means, and modulating and transmitting the data with the decided modulation scheme.

In accordance with a further aspect of the present invention, there is provided an adaptive transmission method comprising the steps of: (a) storing transmission powers that are obtained by quantizing a predetermined range of short-period channel information and long-period channel information; (b) deciding a transmission power for each user and each modulation/coding scheme corresponding to the short-period channel information and the long-period channel information from each terminal using the stored information; (c) selecting users based on the decided transmission power necessary for each user and each modulation/coding scheme and deciding a modulation/coding scheme for each user; and (d) coding user traffic data using the decided coding scheme for each selected user, and modulating and transmitting the data with the decided modulation scheme.

In accordance with a still further aspect of the present invention, there is provided an adaptive transmission method comprising the steps of: (a) storing a target average SNR and a target packet error rate for each modulation/coding scheme; (b) deciding a transmission power for each user and each modulating/coding scheme depending on short-period channel information and long-period channel information provided from each terminal and the stored information; (c) selecting users based on the decided transmission power necessary for each user and each modulation/coding scheme and deciding a modulation/coding scheme for each user; and (d) coding user traffic data using the decided coding scheme for each selected user, and modulating and transmitting the data with the decided modulation scheme.

In accordance with another aspect of the present invention, there is provided an adaptive transmission method comprising the steps of: (a) storing transmission powers that are obtained by quantizing a predetermined range of short-period channel information and long-period channel information; (b) selecting users based on short-period channel information and long-period channel information from each terminal; (c) searching the stored information depending on the short-period channel information and the long-period channel information from each terminal and deciding a transmission power for each modulating/coding scheme for each selected user; (d) deciding a modulation/coding mode for each user based on the decided transmission power necessary for each user and each modulation/coding scheme; and (e) coding user traffic data using the decided coding scheme for each selected user, and modulating and transmitting the data with the decided modulation scheme.

As mentioned above, the invention performs an adaptive transmission by computing a transmission power necessary for each transmission scheme that satisfies a target packet error rate depending on channel change between channel information report time and actual transmission time when adaptive transmission method is adopted at a downlink of mobile communication system using frequency division multiplexing. In addition, the invention can allow a base station to efficiently conduct an adaptive transmission when there are used terminals with no channel prediction device or with different channel prediction devices.

Moreover, in order to efficiently perform an adaptive transmission at a downlink of mobile communication system using frequency division multiplexing, the invention is implemented as follows. Specifically, at a reception end of each terminal, channel after a predetermined minimum transmission delay time is predicted to create channel information. This information is periodically reported to a base station, together with statistic characteristic information of channel prediction error with much longer period than the channel information. For this, each terminal may make use of different channel prediction method or may report channel information measured without using channel prediction device. Meanwhile, at the base station, an adaptive transmission is made by deriving a transmission power necessary upon actual transmission for each transmission scheme based on the channel information and the statistic characteristic information of channel prediction error reported for each user. As a result, the invention enables an efficient adaptive transmission in mobile communication systems that are under various channel environments, and combines with terminals using various channel information creation algorithms and various mobile objects' speeds.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

The above-mentioned objectives, features, and advantages will be more apparent by the following detailed description associated with the accompanying drawings; and based on this, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Generally, a downlink frame is composed of a series of slots, each of which includes one or more symbols. And pilot symbols are well distributed and arranged within the slots in order to estimate a channel. For example, in case of a system using multi-carrier, pilot symbols are well distributed and arranged at time and frequency axes. And also, there is a plurality of data channels inside one slot. At a reception end, channel is estimated by using pilot symbol and then channel information is created based on the estimated channel. When it is required to estimate channel using pilot symbol of nth slot, channel is estimated after delay time of channel estimation filter of the reception end; and then channel information is generated by using the channel and sent via an uplink. Then, at a base station, the channel information is received to acquire downlink channel information, and in harmonization with this, transmission signal is created and sent. Therefore, there exist more than two slots difference between the actual transmission time and the slot the channel estimation is made. Moreover, the actual transmission time may be further delayed by one to two slots based on concrete frame structure of system, delay time of channel estimation filter of the reception end, and time necessary for transmission/reception operation of the base station and terminal. If the transmission is preferentially made by the base station, the difference between the slot the actual transmission is made and the slot the channel is estimated is defined as a minimum transmission delay time D, which may vary depending on systems.

Figure 1:
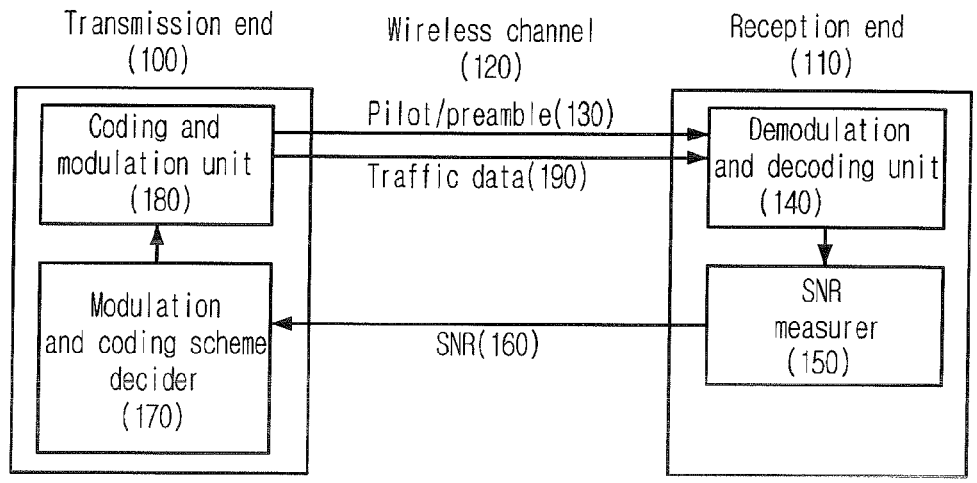
FIG. 1 is a diagram for describing a general adaptive transmission scheme in a mobile communication system using a single carrier.
Figure 2:
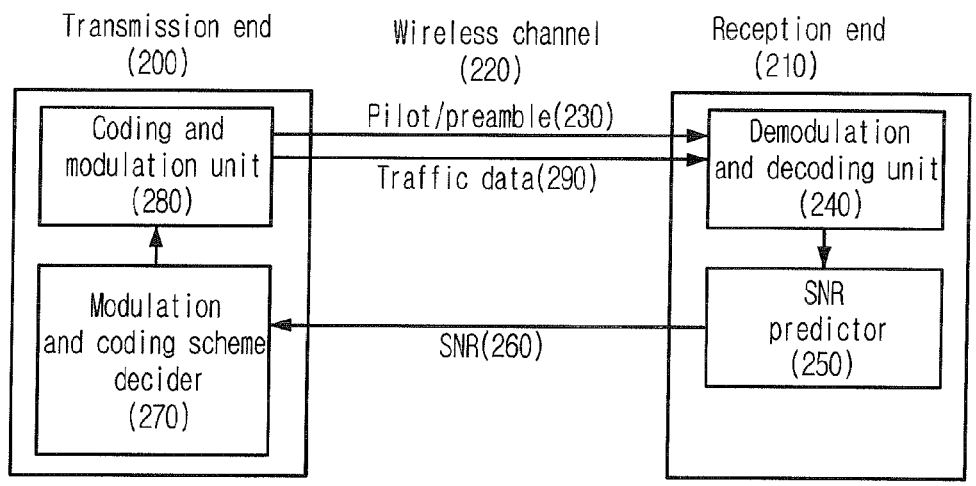
FIG. 2 presents a diagram for describing a general adaptive transmission scheme in a mobile communication system using multi-carrier.
Figure 3:
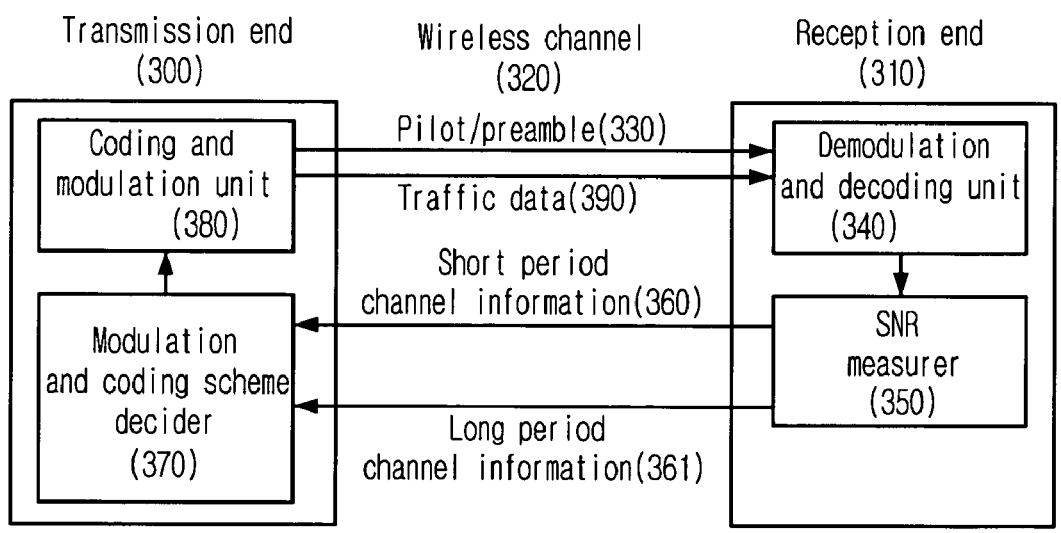
FIG. 3 shows a diagram for describing a scheme for generating short-period channel information by predicting channel, long-period channel information using statistic characteristic of prediction error, and then performing an adaptive transmission using the above channel information, in a mobile communication system using frequency division multiplexing in accordance with an embodiment of the present invention.

FIG. 3 shows a diagram describing a scheme for generating short-period channel information by predicting channel, long-period channel information using statistic characteristic of prediction error, and then performing an adaptive transmission using the above channel information, in a mobile communication system using frequency division multiplexing in accordance with an embodiment of the present invention.

As shown therein, at a demodulation and decoding unit 340 of a reception end 310, a wireless channel 320 is estimated by using a pilot or preamble 330, and then, at an SNR predictor 350, SNR after a minimum transmission delay time D is predicted by predicting channel after the delay time D using the estimated wireless channel to send to a base station as short-period channel information 360. And statistic characteristic of the short-period channel information 360 is obtained by using the predicted channel and actual channel value to be known after the delay time D; and then long-period channel information 361 is created based on the statistic characteristic and sent to a transmission end 300.

Then, at a modulation and coding scheme decider 370 of the transmission end 300, modulation and coding scheme of user is decided by using the short-period channel information 360 and the long-period channel information 361 sent from the reception end 310. Next, at a coding and modulation unit 380, traffic data 390 is generated relying upon the decided modulation and coding scheme and then transmitted to the reception end 310.

In response to the traffic data, at a demodulation and decoding unit 340 of the reception end 310, a demodulation and decoding of the traffic data 390 is carried out.

In this arrangement, each terminal may use various types of prediction equipments or include no prediction equipment. Each terminal sends or reports the short-period channel information and the long-period channel information created by using the statistic characteristic of the short-period channel information, which are estimated or use current value without prediction, regardless of types of the equipments.

Figure 4:
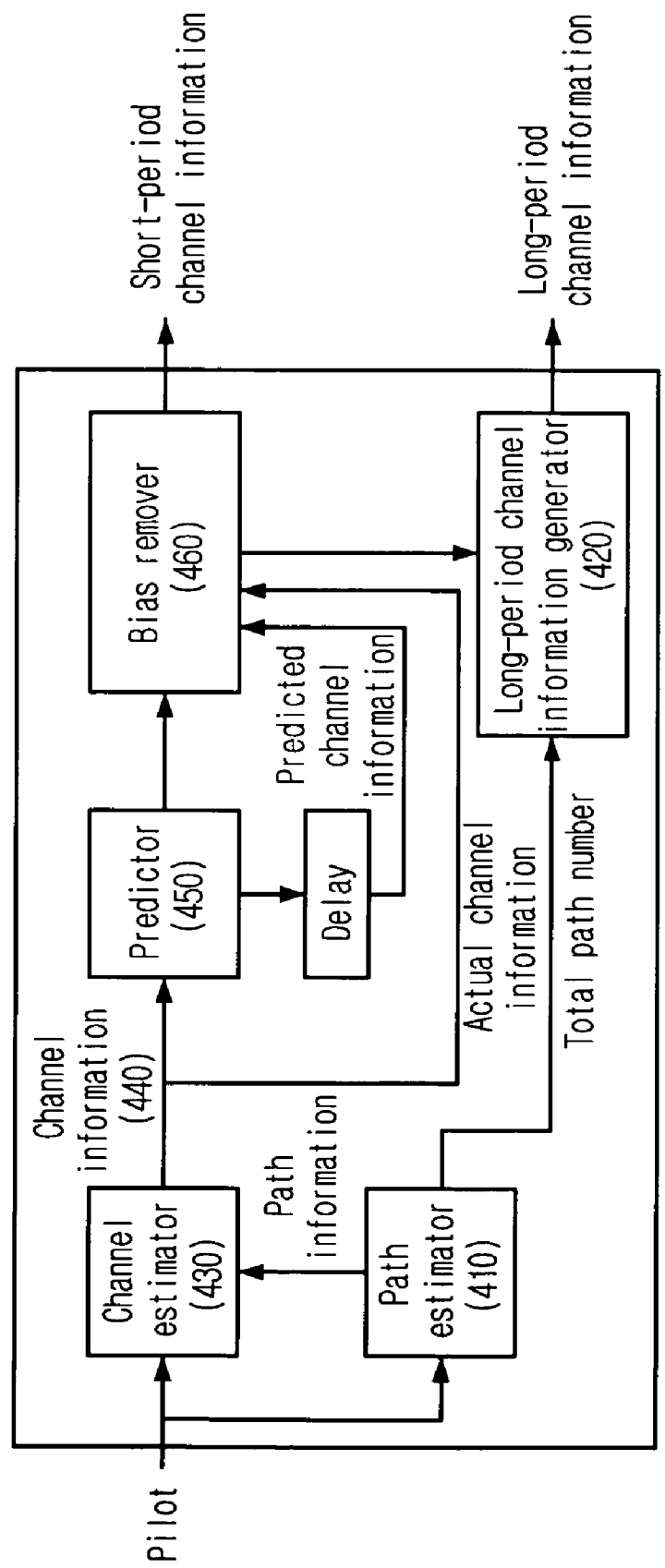
FIG. 4 is a block diagram showing a configuration of an apparatus for predicting channel and then generating the short-period channel information and the long-period channel information to be sent to the base station at each terminal in a mobile communication system using multi-carrier in accordance with an embodiment of the invention.

FIG. 4 is a block diagram showing a configuration of an apparatus for predicting channel and then generating the short-period channel information and the long-period channel information to be sent to the base station at each terminal in a mobile communication system using multi-carrier in accordance with an embodiment of the invention.

The channel information generation apparatus of each terminal predicts channel, and then generates the short-period channel information using the predicted channel and also the long-period channel information with statistic value of the predicted channel, which are to be sent to the base station.

As shown in FIG. 4, paths are estimated by a path estimator 410 from received signal to extract a signal for each path and deliver path information to a channel estimator 430. At a long-period channel information generator 420, a total path number is taken from the path estimator 410 and then sent or reported to the base station as long-period channel information. Meanwhile, the channel estimator 430 finds current channel information 440 using the pilot symbol and the path information from the path estimator 410. The required information can be obtained as few pilots by interpolating information that is estimated through pilots that are well distributed and arranged at the time axis in a single-carrier system and at the frequency axis in a multi-carrier system. At a predictor 450, channel information after the minimum transmission delay time for each path and each carrier may be predicted by a prediction filter by using the estimated current channel information as follows:

$$\hat{h}_l[n+D]=f(h_l[n], h_l[n-1], \ldots, h_l[n-P+1]) \quad \text{Eq. (1)}$$

wherein $h_l[n]$ indicates a channel of complex form at a time n of lth path, P denotes a degree of predictor and f represents a prediction filter. Thus, the predictor can predict channel information after the minimum transmission delay time with P number of current and past channel information. For simplification, it is designed that n+D is defined as time where its parameter is omitted. That is, it is set that $\hat{h}_l=\hat{h}_l[n+D]$.

In deciding a power necessary for transmission at the base station, only power value that is a square of absolute value of the above equation is sufficient, not information of complex number form. Therefore, a combined power value may be calculated by:

$$\hat{p}_{biased} = \sum_{i=0}^{L-1} |\hat{h}_i|^2 \quad \text{Eq. (2)}$$

But, the power value so calculated contains a bias component. Thus, at a bias remover 460, the bias component is removed by using an average value of the channel information predicted at the predictor 450, channel information delayed at a delay after the prediction of the predictor 450 and actual channel information from the channel estimator 430 by the following equation:

$$\hat{p} = \hat{p}_{biased} + E\{p\} - E\{\hat{p}_{biased}\} \quad \text{Eq. (3)}$$

wherein $E\{p\}$ and $E\{\hat{p}_{biased}\}$ are derived with a moving average method by accumulating actual channel information estimated at the time n+D after the time D and channel information predicted at the time n for a sufficiently long term. However, if a power of pilot is $P_{pilot}$, the terminal doesn't actually know that value, and therefore, derives SNR that is proportional to $\hat{p}$ by using Eq. (4) below. In Eq. (4), $\sigma_n^2$ implies a variance of noise. The predicted channel information after the minimum transmission delay time so derived is repeatedly sent or reported to the base station at a predetermined period.

$$\overline{SNR} = \frac{P_{pilot}\hat{p}}{2\sigma_n^2} = \frac{P_{pilot}\hat{p}_{biased}}{2\sigma_n^2} + E\left\{\frac{P_{pilot}p}{2\sigma_n^2} - \frac{P_{pilot}\hat{p}_{biased}}{2\sigma_n^2}\right\} \quad \text{Eq. (4)}$$

At the long-period channel information generator 420, SNR-$\overline{SNR}$ is taken from the bias remover 460; and an average value of $|SNR-\overline{SNR}|^2$ indicating statistic information of error is derived by the moving average method for a long time by using Eq. (5) below and then reported to the base station as one of the long-period channel information.

$$\sigma_{SNR}^2 = E\left\{\left|\frac{P_{pilot}}{2\sigma_n^2}(p-\hat{p})\right|^2\right\} = E\left\{\left|SNR-\overline{SNR}\right|^2\right\} \quad \text{Eq. (5)}$$

Figure 5:
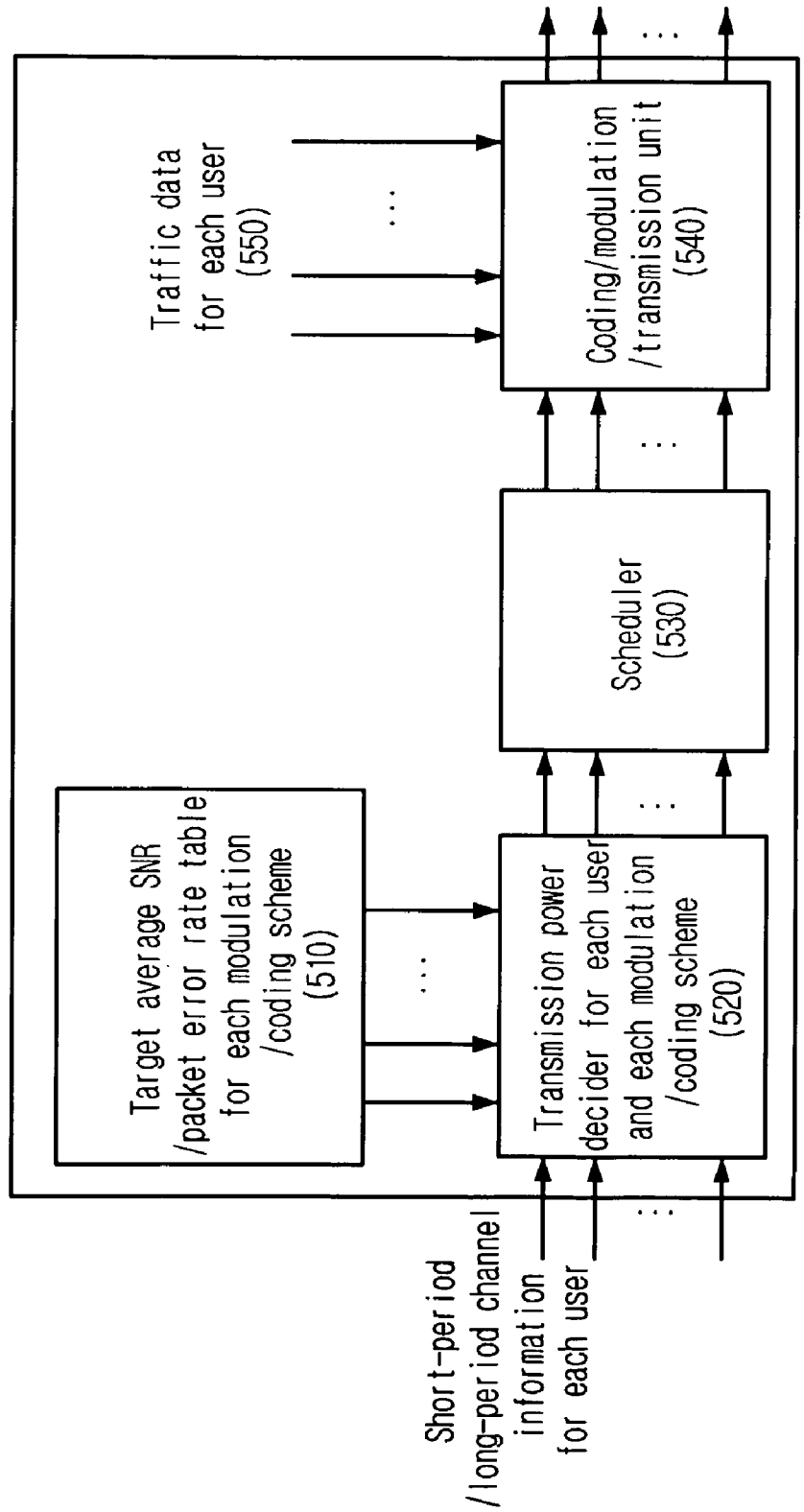
FIG. 5 is a block diagram showing a configuration of an apparatus for performing adaptive transmission at the base station by using the short-period channel information and the long-period channel information sent from each terminal in a mobile communication system using multi-carrier in accordance with an embodiment of the invention.

FIG. 5 is a block diagram showing a configuration of an apparatus for performing adaptive transmission at the base station with the short-period channel information and the long-period channel information sent from each terminal in a mobile communication system using multi-carrier in accordance with an embodiment of the invention.

The base station calculates a transmission power for each modulation and coding scheme with the short-period channel information and the long-period channel information transmitted from each terminal, and then decides and transmits user selection, modulation and coding scheme, and transmission power using the transmission power.

First, a target average SNR and a target packet error rate for each modulation and coding scheme are stored in a target average SNR/packet error rate table 510 for each modulation/coding scheme and then delivered to a transmission power decider 520 for each user and each modulation/coding scheme. At the transmission power decider 520 for each user and each modulation/coding scheme, the short-period channel information and the long-period channel information are received from each user terminal; and then a target SNR is obtained in line with a target packet error rate for each modulation and coding scheme to thereby derive a required transmission power. A target packet error rate for ith modulation and coding scheme of jth user may be given by a function of a target SNR and channel information from the terminal as follows:

$$PER_i = g_i(SNR_{Target,i,j}; \overline{V}_{i,j}) \quad \text{Eq. (6)}$$

where $\nabla$ is a vector indicating channel information reported from each terminal. And a target SNR for ith modulation and coding scheme of jth user may be defined as:

$$SNR_{Target,i,j} = g_i^{-1}(PER_i; \overline{V}_{i,j}) \quad \text{Eq. (7)}$$

Then, the required transmission power is obtained as follows:

$$P_{Tx,i,j} = \frac{SNR_{Target,i,j}}{\overline{SNR}_j} P_{pilot} \quad \text{Eq. (8)}$$

Figure 6:
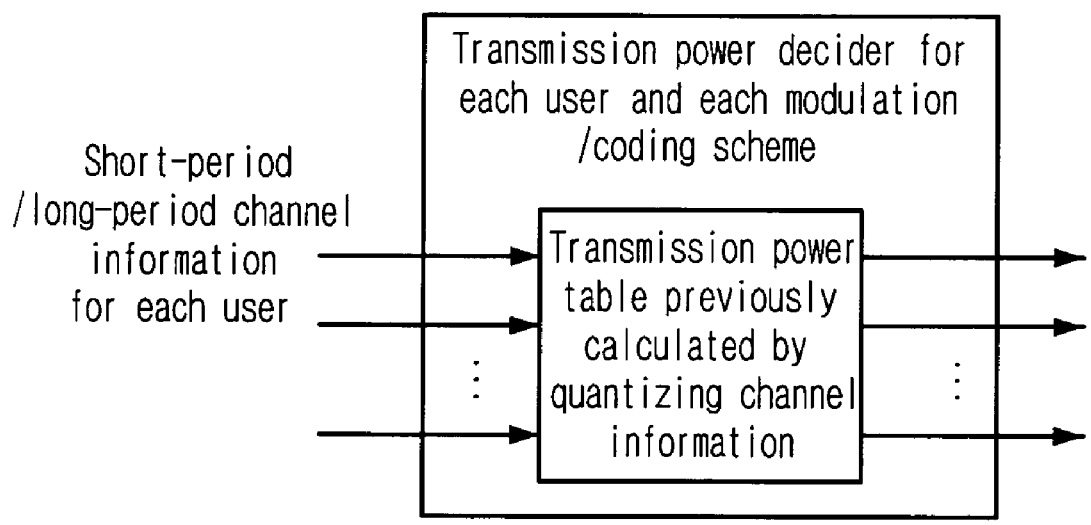
FIG. 6 is a view showing an apparatus for obtaining a transmission power for each modulation and coding scheme from a preset table containing the same with the short-period channel information and the long-period channel information provided from each terminal.

Alternatively, as depicted in FIG. 6, the transmission power may be obtained from a transmission power table that is made in advance by quantizing a certain range of each channel information. FIG. 6 is a view showing an apparatus for acquiring, at the base station, a transmission power for each modulation and coding scheme from a table that stores transmission powers previously calculated with the short-period channel information and the long-period channel information provided from each terminal.

Referring back to FIG. 5, at a scheduler 530, users are selected by utilizing the transmission power necessary for each user and each modulation and coding scheme derived at the transmission power decider 520 for each user and each modulation/coding scheme and then modulation and coding scheme for each user is decided. At a coding/modulation/transmission unit 540, traffic data 550 for each user is coded with the coding mode decided for each user selected at the scheduler 530; and then modulated with the decided modulation mode and sent to the terminal.

Figure 7:
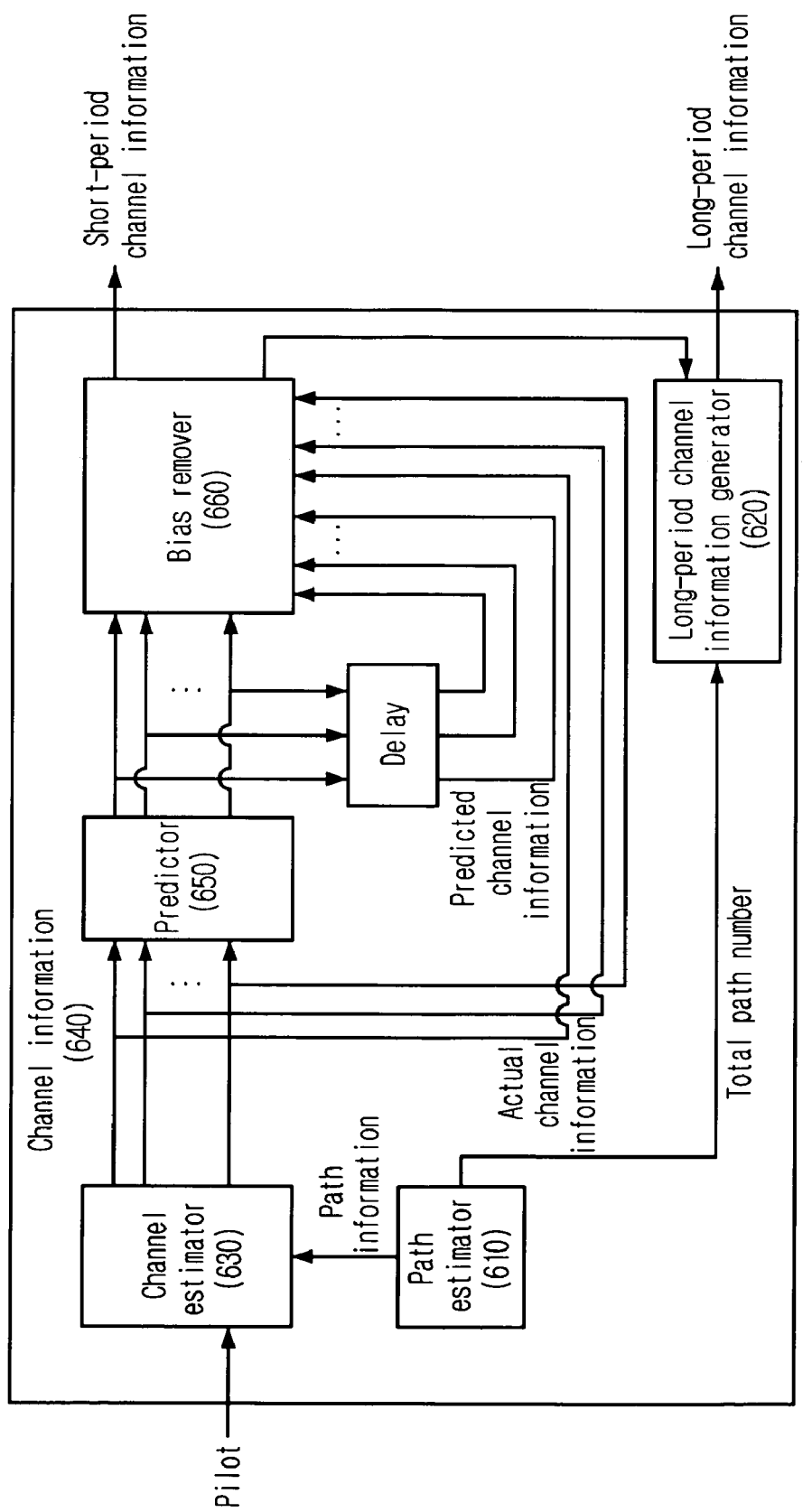
FIG. 7 is a block diagram showing a configuration of an apparatus for creating the short-period channel information and the long-period channel information at each terminal in a mobile communication system using multi-carrier in accordance with another embodiment of the invention.

FIG. 7 is a block diagram showing a configuration of an apparatus for generating the short-period channel information and the long-period channel information at each terminal in a mobile communication system using multi-carrier in accordance with another embodiment of the present invention.

As shown in FIG. 7, at a path estimator 610, path information is obtained by separating received signal for each path and then delivered to a channel estimator 630. Next, at a long-period channel information generator 620, a total path number is received from the path estimator 610 and then provided to the base station as the long-period channel information. Then, at the channel estimator 630, current channel information 640 is estimated by using pilot symbol for each path; and then channel information for all paths is obtained by interpolating with respect to the time and the frequency axes. At a predictor 650, channel information after the minimum transmission delay time for each path can be predicted by a prediction filter by accumulating the estimated current channel information. In case of a single-carrier system, the channel can be predicted by using Wiener prediction filter. And in case of a multi-carrier system, the channel can be predicted by estimating at the frequency axis, and converting this into the time axis and then by using Wiener prediction filter for each path. The predictor 650 may predict the channel information after the minimum transmission delay time for each path by Wiener prediction filter by accumulating the estimated current channel information as follows:

$$\hat{h}_l[n+D] = \sum_{k=0}^{P-1} a_l[k]h_l[n-k] \quad \text{Eq. (9)}$$

wherein $a_l$ indicates coefficient of channel prediction filter of lth path and may be obtained by orthogonality principle as:

$$\sum_{k=0}^{P-1} R_{h,l}[i-k]a_l[k] = R_{x,l}[i+D], i = 0, 1, \ldots, P-1 \quad \text{Eq. (10)}$$

$$\begin{bmatrix} R_{h,l}[0] & R_{h,l}[-1] & \cdots & R_{h,l}[-P+1] \\ R_{h,l}[1] & \ddots & & \vdots \\ \vdots & & \ddots & \vdots \\ R_{h,l}[P-1] & \cdots & \cdots & R_{h,l}[0] \end{bmatrix}$$

$$\begin{bmatrix} a_l[0] \\ a_l[1] \\ \vdots \\ a_l[P-1] \end{bmatrix} = \begin{bmatrix} R_{x,l}[D] \\ R_{x,l}[D+1] \\ \vdots \\ R_{x,l}[P+D-1] \end{bmatrix}$$

$$\begin{bmatrix} a_l[0] \\ a_l[1] \\ \vdots \\ a_l[P-1] \end{bmatrix} = \begin{bmatrix} R_{h,l}[0] & R_{h,l}[-1] & \cdots & R_{h,l}[-P+1] \\ R_{h,l}[1] & \ddots & & \vdots \\ \vdots & & \ddots & \vdots \\ R_{h,l}[P-1] & \cdots & \cdots & R_{h,l}[0] \end{bmatrix}^{-1} \begin{bmatrix} R_{x,l}[D] \\ R_{x,l}[D+1] \\ \vdots \\ R_{x,l}[P+D-1] \end{bmatrix}$$

wherein $R_{h,l}[k]=E\{|h_l(k)|^2\}$ and $R_{x,y}[k]=E\{|x_l(k)|^2\}$; and these may be derived through the moving average method by using the estimated channel value for each path for a long term. Accordingly, the predictor can predict the channel information after the minimum transmission delay time with P number of current and past channel information. Using only a single predictor, the channel information may be predicted by combining the current channel information for each path.

Upon decision of a power necessary for transmission at the base station, only power value that is a square of absolute value of the above equation is sufficient, instead of information of complex number form. Therefore, a combined power value may be calculated by using Eq. (2) above.

But, the power value so calculated also contains a bias component. Thus, at a bias remover 660, the bias components are removed by using the actual channel information from the channel estimator 630, channel information delayed at the delay after the prediction by the predictor 650 and the statistic information of channel information predicted by the predictor 650 through Eq. (3) above.

As described above, in Eq. (3), $E\{p\}$ and $E\{\hat{p}_{biased}\}$ are derived by moving-averaging p and $\hat{p}_{biased}$ for a long time. However, since the terminal doesn't actually know $P_{pilot}$ as mentioned above, and therefore, it can't derive $\hat{p}$ and instead, derives $$\overset{\Box}{SNR} = \frac{P_{pilot}\hat{p}}{2\sigma_n^2}$$

that is proportional to that value. At the long-period channel information generator 620, SNR–$\overset{\Box}{SNR}$ is taken from the bias remover 660; and then statistic information of error is derived by using Eq. (5) above and reported to the base station as one of the long-period channel information.

Under the actual channel environment, since average gains of the respective paths are different from one another, variances of respective errors are different wherein it is assumed that this is constant with $\sigma_p^2/L$ when the number of paths is L. Here, $\sigma_p^2$ is $E\{|p-\hat{p}|^2\}$. Then, when $\hat{h}$ is given, $$p = \sum_{i=0}^{L-1} |h_l|^2$$

and $|h_l|^2$ is a sum of square of real part and imaginary part that are normal random variables. Therefore, p becomes chi-square random variable with degree of freedom of 2. Now, probability distribution of p when $\hat{p}$ is given will be described below. First of all, the probability distribution of noncentral chi-square normal variable Y is given by:

$$f_y(y) = \frac{1}{2\sigma^2}\left(\frac{y}{s^2}\right)^{\frac{m-1}{4}} \exp\left(-\frac{s^2+y}{2\sigma^2}\right) I_{s-1}\left(\frac{1}{\sigma^2}\sqrt{ys^2}\right) \quad \text{Eq. (11)}$$

wherein $\sigma^2$ represents a variance of each random variance when a square of n number of normal random variables is added and $$s^2 = \sum_{i=1}^{n} m_i^2$$

when each average is $m_i$.

The complex channel value h has a form where prediction error $\epsilon$ is added to a channel value $\hat{h}$ predicted as follows:

$$h = \hat{h} + \epsilon \quad \text{Eq. (12)}$$

where since h and $\hat{h}$ are all complex normal random variables, $\epsilon$ is also complex normal random variable. Thus, when $\hat{h}$ is given, they become complex normal random variables where h has $\hat{h}$ as average value and a variance of $\epsilon$ as variance thereof. And, since $\hat{h}$ and $\epsilon$ use Wiener prediction filter, and therefore, they don't have correlation value and $|h|^2=|\hat{h}+\epsilon|^2$ is a sum of square of normal random variables having each of real part and imaginary part of $\hat{h}$ as average. Accordingly, since it is assumed that p is the same as variance of error of each path, the variances $\sigma^2$ of each normal random variable are all the same. This becomes a noncentral chi-square random variable where a square of 2L number of normal random variables is added. If $\sigma_h^2 = \sigma_f^2 = 2\sigma^2$, then $$\sigma^2 = \frac{\sigma_\varepsilon^2}{2}$$

and $$s^2 = \sum_{i=1}^{n} m_i^2 = \sum_{l=0}^{L-1} |\hat{h}_l|^2 = \hat{p} - (E\{p\} - E\{\hat{p}_{biased}\}) = \hat{p} - L\sigma_\varepsilon^2.$$

Thus, the following equation may be obtained by applying these to Eq. (12) above.

$$f(p\mid \hat{p}) = \frac{1}{\sigma_\varepsilon^2}\left(\frac{p}{\hat{p}-L\sigma_\varepsilon^2}\right)^{\frac{L-1}{2}} \exp\left(-\frac{p+(\hat{p}-L\sigma_\varepsilon^2)}{2\sigma_\varepsilon^2}\right) I_{L-1}\left(\frac{2}{\sigma_\varepsilon^2}\sqrt{p(\hat{p}-L\sigma_\varepsilon^2)}\right) \quad \text{Eq. (13)}$$

Figure 8:
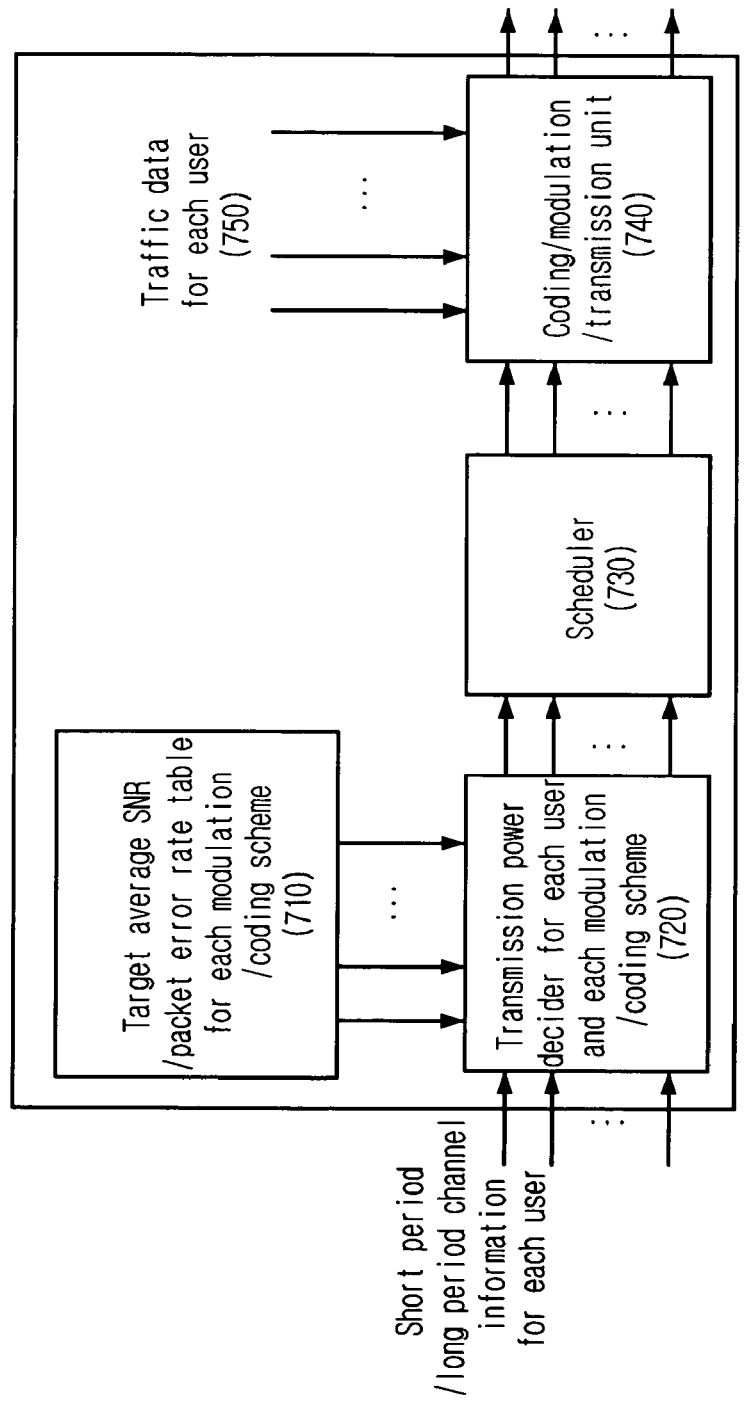
FIG. 8 is a block diagram showing a configuration of an apparatus for deciding modulation and coding scheme, user selection and transmission power and then conducting an adaptive transmission based on the same at the base station when a mobile communication system using multi-carrier adopts a noncentral chi-square channel model in accordance with another embodiment of the invention.

FIG. 8 is a block diagram showing a configuration of an apparatus for deciding modulation and coding scheme, user selection and transmission power and then conducting an adaptive transmission based on the same at the base station when a mobile communication system using multi-carrier adopts a noncentral chi-square channel model, e.g., frequency division multiplexing at multi-path attenuation channel in accordance with another embodiment of the invention.

First, a target average SNR and a target packet error rate for each modulation/coding scheme are stored in a target average SNR/packet error rate table 710 for each modulation and coding scheme and then delivered to a transmission power decider 720 for each user and each modulation/coding scheme. When the short-period channel information $\hat{p}$ is given, a coded packet error rate for ith modulation and coding mode may be approximated as follows:

$$PER_i(p\mid \hat{p}) = \begin{cases} a_i \exp\left(-\frac{b_i SNR_{Target,i,j}}{\hat{p}} p\right) & p \geq \frac{\gamma_{Th,i}\hat{p}}{SNR_{Target,i,j}} \\ 1 & p < \frac{\gamma_{Th,i}\hat{p}}{SNR_{Target,i,j}} \end{cases} \quad \text{Eq. (14)}$$

wherein $a_{n,i}$, $b_{n,i}$ are constants decided depending on the modulation and coding scheme and $\gamma_{Th,i}$ is a threshold value to allow the packet error rate of 1. These constants and threshold value $a_i$, $b_i$, $\gamma_{Th,i}$ can be derived by prior simulation.

At the transmission power decider 720 for each user and each modulation/coding scheme, the short-period channel information and the long-period channel information are received from each user terminal; and then a target SNR is obtained in accord with a target packet error rate for each modulation and coding scheme to derive a required transmission power. When the short-period channel information $\hat{p}_j$ indicating a predicted channel value of jth user is given, an actual channel value p is $\hat{p}_j+\epsilon$, which has a form where error is added to the predicted value. Therefore, when $\hat{p}_j$ and the long-period channel information are given, a packet error rate for ith modulation and coding scheme of jth user may be computed by an average of p as follows:

Eq. (15)

$$PER_i(SNR_{Target,i,j}\mid \hat{p}_j, L_j, \sigma_{\varepsilon,j}^2) =$$

$$\int_0^\infty PER_i(p)f(p\mid \hat{p}_j)dp = \int_0^\infty f(p\mid \hat{p}_f)dp + $$

$$\int_{p_{Th,i}}^\infty a_i \exp\left(-b_i \frac{SNR_{Target,i,j}}{\hat{p}}p\right) \frac{1}{\sigma_{\varepsilon,j}^2}\left(\frac{p}{\hat{p}_j - L_j\sigma_\varepsilon^2}\right)^{\frac{L_j-1}{2}} \cdot$$

$$\exp\left(-\frac{p+(\hat{p}_j-L\sigma_{\varepsilon,j}^2)}{\sigma_{\varepsilon,j}^2}\right) I_{L-1}\left(\frac{2}{\sigma_{\varepsilon,j}^2}\sqrt{p(\hat{p}_j-L\sigma_{\varepsilon,j}^2)}\right) dp =$$

$$\left[1 - Q_{Lj}\left(\sqrt{2(\hat{p}_j/\sigma_{\varepsilon,j}^2 - L_j)}, \sqrt{\frac{p_{Th,i}}{\sigma_{\varepsilon,j}^2/2}}\right)\right] +$$

-continued $$a_i\left(\frac{\hat{p}_j/\sigma_{\varepsilon,j}^2}{\hat{p}_j/\sigma_{\varepsilon,j}^2 + b_i SNR_{Target,i,j}}\right)^{L_j} \exp\left(-\frac{b_i SNR_{Target,i,j}(\hat{p}_j/\sigma_{\varepsilon,j}^2 - L_j)}{\hat{p}_j/\sigma_{\varepsilon,j}^2 + b_i SNR_{Target,i,j}}\right) \cdot$$

$$Q_{Lj}\left(\sqrt{\frac{2\frac{\hat{p}_j}{\sigma_{\varepsilon,j}^2}(\hat{p}_j/\sigma_{\varepsilon,j}^2 - L_j)}{\hat{p}_j/\sigma_{\varepsilon,j}^2 + b_i SNR_{Target,i,j}}}, \sqrt{2\frac{p_{Th,i}}{\hat{p}_j}(\hat{p}_j/\sigma_{\varepsilon,j}^2 + b_i SNR_{Target,i,j})}\right)$$

However, since $\bar{SNR}_j$ is actually reported in lieu of $\hat{p}_j$, the equation can't be directly used but can be used after minor modification of the information reported from the terminal. First, Eq. (16) is introduced below:

$$\sigma_{p,j}^2 = 4L_j\left(\frac{\sigma_{\varepsilon,j}^2}{2}\right)^2 + 4\frac{\sigma_{\varepsilon,j}^2}{2}(\hat{p}_j - L_j\sigma_{\varepsilon,j}^2) \quad \text{Eq. (16)}$$

$$= 2\sigma_{\varepsilon,j}^2\hat{p}_j - L_j(\sigma_\varepsilon^2)^2$$

wherein $\sigma_{p,j}^2$ is composed of square of 2L number of normal random variables whose variance is $\sigma_\varepsilon^2/2$, and is a variance value of chi-square random variable whose average is $\hat{p}_j$. Eq. (17) may be obtained below by multiplying both sides of Eq. (16) above by $$\left(\frac{P_{pilot}}{2\sigma_n^2}\right)^2.$$

$$\frac{P_{pilot}\sigma_{\varepsilon,j}^2}{2\sigma_n^2} = \frac{SNR_j - \sqrt{SNR_j^2 - L_j \cdot \sigma_{SNR,j}^2}}{L_j} \quad \text{Eq. (17)}$$

Then, dividing $\bar{SNR}_j$ by the value so obtained can derive $\hat{p}/\sigma_{\varepsilon,j}^2$. And, $$\frac{p_{Th,i}}{\hat{p}_j}$$

may be obtained by:

$$\frac{\gamma_{Th,i}}{SNR_j} = \frac{\frac{P_{pilot}p_{Th,i}}{2\sigma_n^2}}{\frac{P_{pilot}\hat{p}_j}{2\sigma_n^2}} = \frac{p_{Th,i}}{\hat{p}_j} \quad \text{Eq. (18)}$$

Since $a_i$, $b_i$, $L_j$ are all known, $PER_i(SNR_{Target,i,j}\mid \hat{p}_j, L_j, \sigma_{\varepsilon,j}^2)$ can be derived if only $SNR_{Target,i,j}$ is decided. $PER_i$ is a monotonous decrease function of $SNR_{Target,i,j}$; and therefore, a target SNR for ith modulation and coding mode of jth user can be easily computed through the binary search method by exchanging $SNR_{Target,i,j}$.

Then, the required transmission power may be also calculated by using Eq. (8) as described above.

Figure 9:
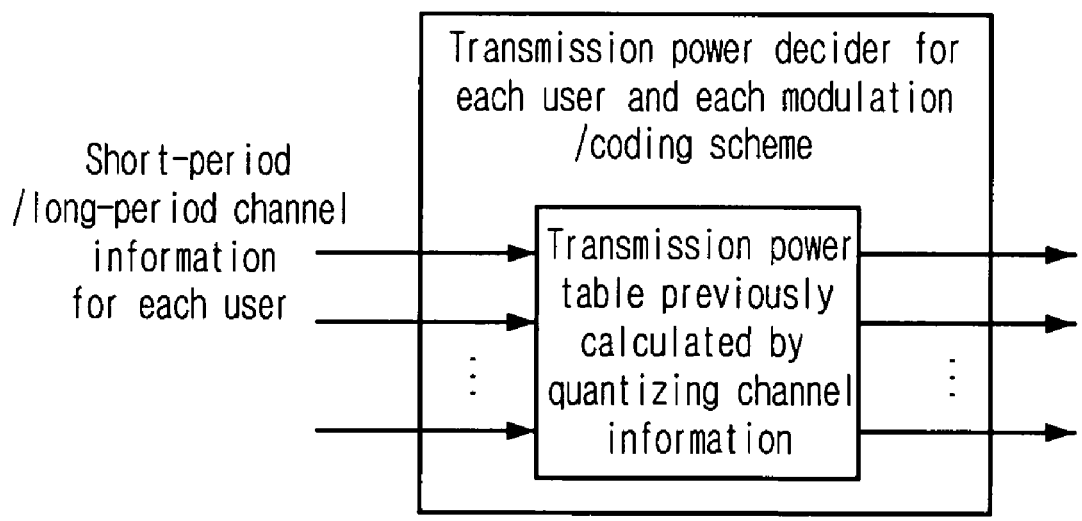
FIG. 9 is view showing an apparatus for deriving a transmission power for each modulation and coding scheme from a preset table having the same with the short-period channel information and the long-period channel information provided from each terminal at the base station of system using noncentral chi-square distribution.

Otherwise, as illustrated in FIG. 9, the transmission power may be decided with a table that is formed in advance by quantizing a certain range of the short-period channel information $\bar{S}NR_j$ and the long-period channel information $\sigma_{SNR,j}^2$ and then calculating a corresponding transmission power with representative value of each range. FIG. 9 shows an apparatus for deriving the transmission power for each modulating and coding scheme from a table that stores transmission powers calculated in advance with the short-period channel information and the long-period channel information provided from each terminal at the base station of system using noncentral chi-square distribution.

Thereafter, at a scheduler 730, users are selected by using the transmission power necessary for each user and each modulation and coding scheme derived at the transmission power decider 720 for each user and each modulation/coding scheme and then modulation and coding scheme for each user is decided. And at a coding/modulation/transmission unit 740, traffic data 750 for each user is coded with the coding scheme decided for each user selected at the scheduler 730; and then modulated with the decided modulation scheme and sent to the terminal.

Figure 10:
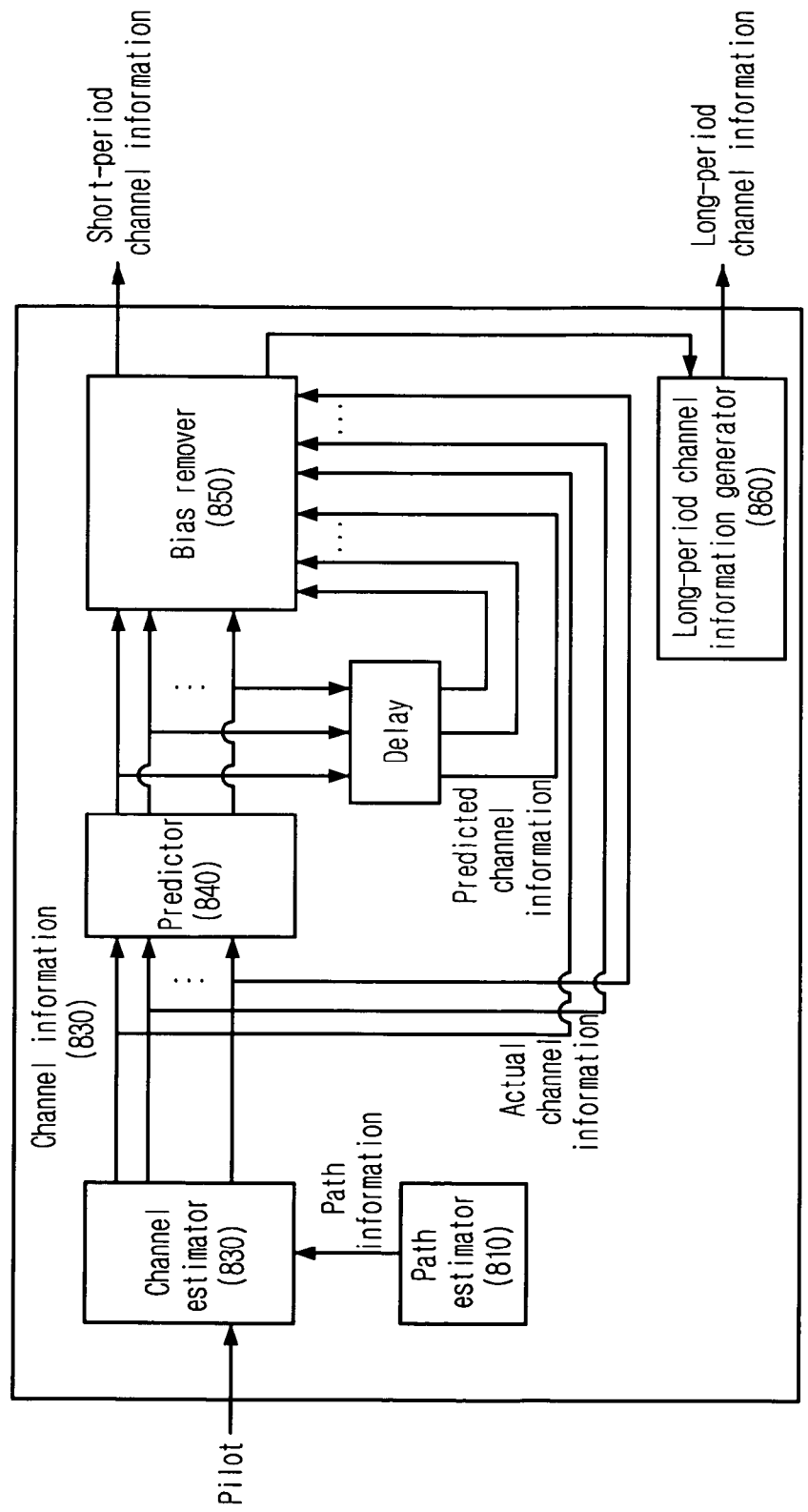
FIG. 10 is a block diagram showing a configuration of an apparatus for generating the short-period channel information and the long-period channel information at each terminal in a mobile communication system using multi-carrier in accordance with another embodiment of the invention.

FIG. 10 is a block diagram showing a configuration of an apparatus for generating the short-period channel information and the long-period channel information at each terminal in a mobile communication system using multi-carrier, e.g., frequency division multiplexing at multi-path attenuation channel in accordance with another embodiment of the invention.

Differently from the channel information generation apparatus as shown in FIG. 7, the channel information generation apparatus as shown in FIG. 10 is not assumed to have a specific wireless channel model. As shown in FIG. 10, at a path estimator 810, path information is obtained by separating received signal for each path and then delivered to a channel estimator 820. Next, at the channel estimator 820, current channel information 830 is estimated by using pilot symbol for each path and then channel information for all paths are obtained by interpolating with respect to the time and the frequency axes. At a predictor 840, channel information after the minimum transmission delay time can be predicted by a prediction filter by accumulating the estimated current channel information. As mentioned above, in case of a single-carrier system, the channel may be predicted by using Wiener prediction filter. And in case of a multi-carrier system, the channel may be predicted by estimating at the frequency axis, and converting it into the time axis and then using Wiener prediction filter for each path.

In deciding a power necessary for transmission at the base station, only power value that is a square of absolute value of the above equation is sufficient, in lieu of information of complex number form. Therefore, a power value $\hat{p}_{biased}$ of channel can be predicted. Since bias is involved in the power value so predicted, it is removed at a bias remover 850 by using the actual channel information from the channel estimator 820, channel information delayed at a delay after the prediction by the predictor 840 and the statistic information of channel information predicted by the predictor 840 through Eq. (3) above.

As described above, $E\{p\}$ and $E\{\hat{p}_{biased}\}$ are derived by moving-averaging p and $\hat{p}_{biased}$ for a long time. However, since the terminal doesn't actually know $P_{pilot}$ as mentioned above, and therefore, it can't derive $\hat{p}$ and instead, derives $$\bar{S}NR = \frac{P_{pilot}\hat{p}}{2\sigma_n^2}$$

that is proportional to that value. At a long-period channel information generator 860, SNR–$\bar{S}$NR is received from the bias remover 850; and statistic information of error is derived by using Eq. (5) above and then reported to the base station as the long-period channel information.

If it is assumed that probability distribution of actual combined channel power p is normal distribution when the short-period channel information and the long-period channel informational so obtained are used and the predicted channel power $\hat{p}$ is given, the following equation is obtained.

$$f(p|\hat{p}) = \frac{1}{\sqrt{2\pi\sigma_p^2}}\exp\left(-\frac{(p-\hat{p})^2}{2\sigma_p^2}\right) \qquad \text{Eq. (19)}$$

$$\sigma_p^2 = E\{|p-\hat{p}|^2\}$$

As described early, since the normal distribution is used irrespective of actual channel model; and thus, it is very simple since no estimation of probability distribution of channel value is needed in various channel environments although error is involved in the transmission power. In addition, it can be seen that the probability distribution of actual combined channel power p is well suitable to the normal distribution according to a central limit theorem if the number of paths is large.

Figure 11:
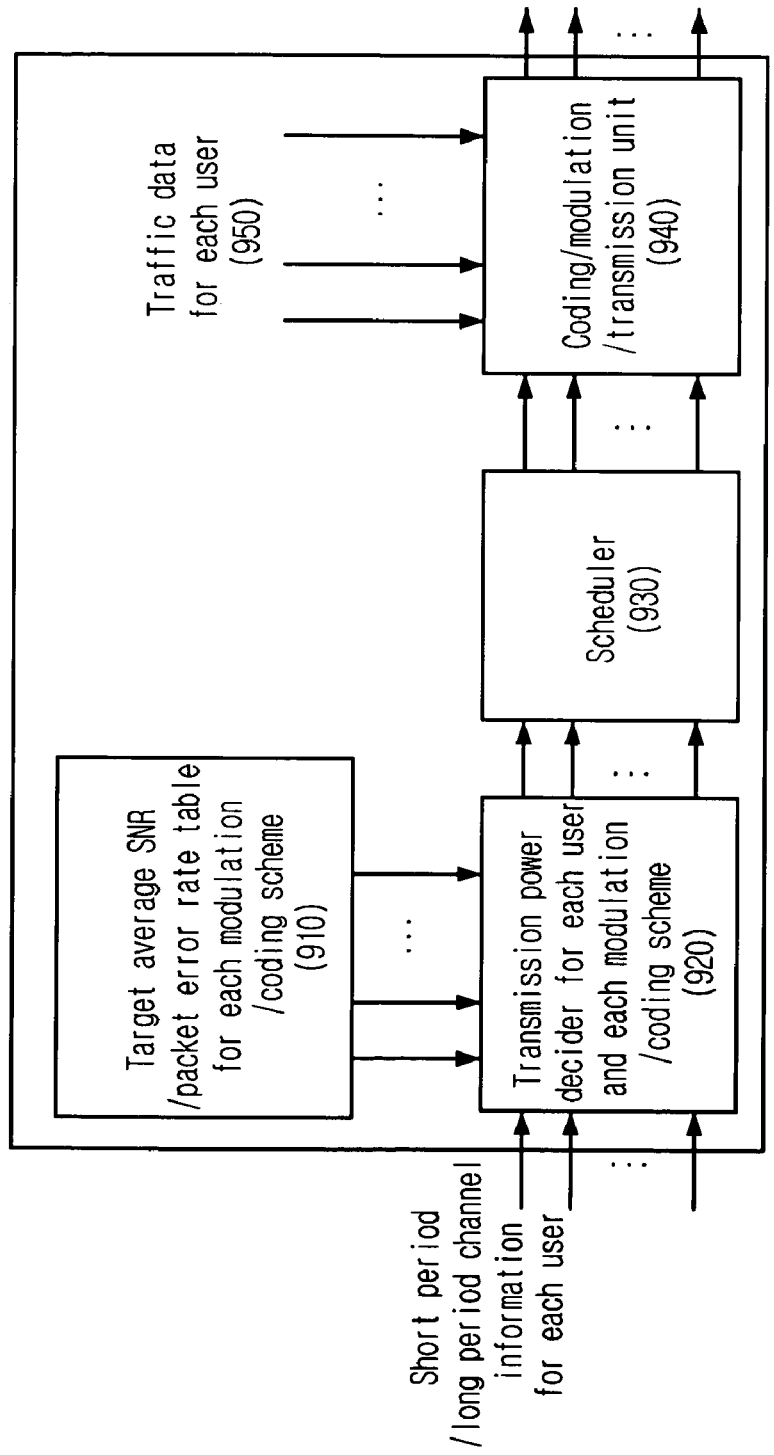
FIG. 11 is a block diagram showing a configuration of an apparatus for deciding modulation and coding scheme, user selection and transmission power and performing an adaptive transmission based thereon at the base station when a mobile communication system using multi-carrier adopts a normal distribution channel model in accordance with another embodiment of the invention.

FIG. 11 is a block diagram showing a configuration of an apparatus for deciding modulation and coding scheme, user selection and transmission power and performing an adaptive transmission based thereon at the base station when a mobile communication system using multi-carrier adopts a normal distribution channel model in accordance with another embodiment of the invention.

Since the adaptive transmission apparatus shown in FIG. 11 approximates distribution of the channel information to normal distribution, it can be used regardless of the channel model. Therefore, the operation of the adaptive transmission apparatus is similar to that of the apparatus depicted in FIG. 8 that adopts the noncentral chi-square probability distribution. But, the adaptive transmission apparatus of FIG. 11 doesn't need the part of taking the total path number as the long-period channel information.

Specifically, first, a target average SNR and a target packet error rate for each modulation/coding scheme are stored in a target average SNR/packet error rate table 910 for each modulation/coding scheme and then delivered to a transmission power decider 920 for each user and each modulation/coding scheme. When the short-period channel information $\hat{p}_j$ is given, a coded packet error rate for ith modulation and coding scheme may be obtained by using Eq. (14) above.

At the transmission power decider 920 for each user and each modulation/coding scheme, the short-period channel information and the long-period channel information are received from each user terminal and then a target SNR is obtained in accord with a target packet error rate for each modulation and coding scheme to derive a required transmission power. When the short-period channel information $\hat{p}_j$ indicating a predicted channel value of jth user is given, an actual channel value p is $\hat{p}_j+\epsilon$, which has a form where an error is added to the predicted value. Therefore, when $\hat{p}_j$ and the long-period channel information are given, a target packet error rate for ith modulation and coding scheme of jth user may be defined by an average of p as follows:

$$PER_i(SNR_{Target,i,j} \mid \hat{p}_j, \sigma_{p,j}^2) = \int_{-\infty}^{\infty} PER(p, SNR_{Target,i,j} \mid \hat{p}_j) f(p \mid \hat{p}_j, \sigma_{p,j}^2) dp \qquad \text{Eq. (20)}$$

$$= a_i \exp\left(-b_i SNR_{Target,i,j} + \frac{b_i^2 SNR_{Target,i,j}^2}{2(\hat{p}/\sigma_{p,j})^2}\right) A + B$$

$$A = \begin{cases} Q\left(\left(\frac{\gamma_{Th,i}}{SNR_{Target,i,j}} - 1\right)\hat{p}_j/\sigma_{p,j} + \frac{b_i SNR_{Target,i,j}}{\hat{p}_j/\sigma_{p,j}}\right) & \text{if } \left(\frac{\gamma_{Th,i}}{SNR_{Target,i,j}} - 1\right)\hat{p}_j/\sigma_{p,j} + \frac{b_i SNR_{Target,i,j}}{\hat{p}_j/\sigma_{p,j}} \geq 0 \\ 1 - Q\left(-\left(\frac{\gamma_{Th,i}}{SNR_{Target,i,j}} - 1\right)\hat{p}_j/\sigma_{p,j} - \frac{b_i SNR_{Target,i,j}}{\hat{p}_j/\sigma_{p,j}}\right) & \text{if } \left(\frac{\gamma_{Th,i}}{SNR_{Target,i,j}} - 1\right)\hat{p}_j/\sigma_{p,j} + \frac{b_i SNR_{Target,i,j}}{\hat{p}_j/\sigma_{p,j}} < 0 \end{cases}$$

$$B = \begin{cases} 1 - Q\left(\left(\frac{\gamma_{Th,i}}{SNR_{Target,i,j}} - 1\right)\hat{p}_j/\sigma_{p,j}\right) & \text{if } \left(\frac{\gamma_{Th,i}}{SNR_{Target,i,j}} - 1\right)\hat{p}_j/\sigma_{p,j} \geq 0 \\ Q\left(-\left(\frac{\gamma_{Th,i}}{SNR_{Target,i,j}} - 1\right)\hat{p}_j/\sigma_{p,j}\right) & \text{if } \left(\frac{\gamma_{Th,i}}{SNR_{Target,i,j}} - 1\right)\hat{p}_j/\sigma_{p,j} < 0 \end{cases}$$

wherein $\sigma_{p,j}$ indicates a square root of $$\sigma_{SNR}^2 \left(\frac{2\sigma_n^2}{P_{pilot}}\right)^2.$$

Since the power value may be no less than "0," but is approximated to normal distribution, it is integrated with respect to the range of $-\infty \sim \infty$. In the same manner as the above example, the target SNR for predicted value of given channel power and target packet error rate can be obtained in opposition through the binary search method, etc. Then, the required transmission power can be decided based on the above target SNR.

However, as mentioned above, the information reported from the terminal is not actual channel value but a value scaled to $$\frac{P_{pilot}}{2\sigma_n^2}.$$

The short-period channel information is $$\left(\frac{P_{pilot}\sigma_{p,j}}{2\sigma_n^2}\right)^2,$$

and the long-period channel information is $$\frac{P_{pilot}\hat{p}_j}{2\sigma_n^2}$$

and thus, $\hat{p}_j/\sigma_{p,j}$ can be obtained by dividing the short-period channel information by the long-period channel information. Then, since the remaining values except for $SNR_{Target,i,j}$ are all decided, $SNR_{Target,i,j}$ can be computed through the use of the binary search method.

Figure 12:
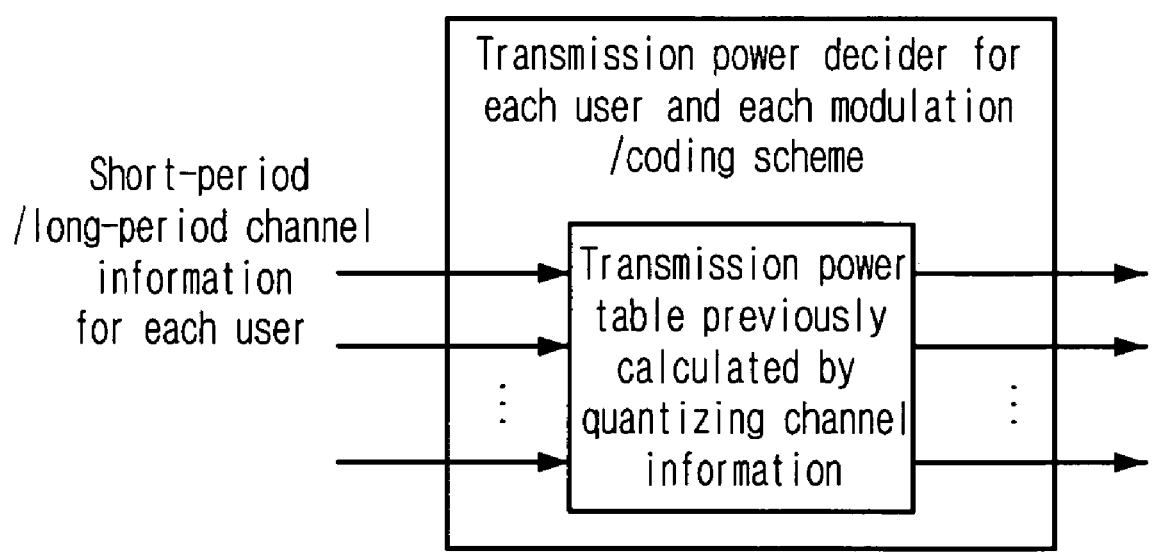
FIG. 12 is a view showing an apparatus for obtaining a transmission power for each modulation and coding scheme from a table that stores transmission powers calculated in advance with the short-period channel information and the long-period channel information provided from each terminal at the base station of system using a normal distribution.

Alternatively, as depicted in FIG. 12, the transmission power may be decided through the use of a table that is made in advance by quantizing a certain range of the short-period channel information $\widehat{SNR}_j$ and the long-period channel information $\sigma_{SNR,j}^2$ and then calculating a corresponding transmission power with representative value of each range. FIG. 12 shows a view of an apparatus for deriving the transmission power for each modulation and coding scheme from a table that stores transmission powers calculated in advance with the short-period channel information and the long-period channel information provided from each terminal at the base station of system using the normal distribution.

Referring back to FIG. 11, at a scheduler 930, users are selected by using the transmission power necessary for each user and each modulation/coding scheme derived at the transmission power decider 920 for each user and each modulation/coding scheme and then modulation and coding scheme for each user is decided. And at a coding/modulation/transmission unit 940, traffic data 950 for each user is coded with the coding scheme decided for each user selected at the scheduler 930; and then modulated with the decided modulation scheme and sent to the terminal.

Hereinafter, the channel information generation method and the adaptive transmission method will be described with reference to FIGS. 13 to 18. But, their concrete implementation techniques are the same as those of FIGS. 4 to 9; and therefore, only summary thereof will be introduced below.

Figure 13:
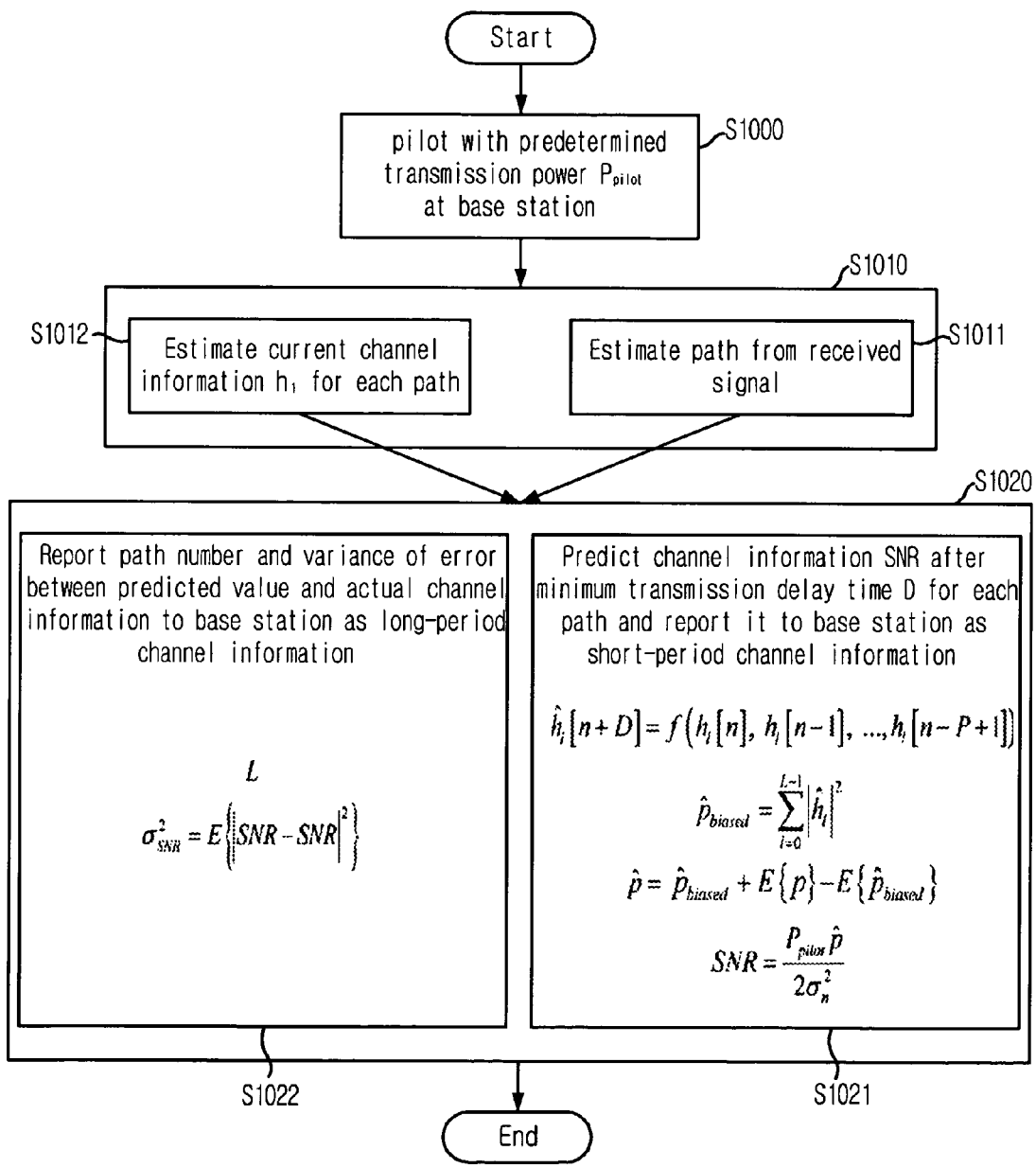
FIG. 13 is a flowchart showing a method for predicting channel and then generating the short-period channel information and long-period channel information to be sent to the base station at each terminal in a mobile communication system using multi-carrier in accordance with an embodiment of the invention.

FIG. 13 is a flowchart showing a method for predicting channel and then generating short-period channel information and long-period channel information to be sent to the base station at each terminal in a mobile communication system using multi-carrier in accordance with an embodiment of the invention.

First, when a transmission end sends a pilot with a predetermined transmission power $P_{pilot}$, a reception end receives it at step S1000.

Next, at the reception end, path and channel information are estimated at step S1010 with the received pilot.

And then, using the estimated channel information, channel information after a predetermined minimum transmission delay time is predicted and sent or reported to a base station as short-period channel information. Also, path number and statistic information of error between the predicted channel information and actual channel information are obtained and reported to the base station as long-period channel information at step S1020.

To be more specific, the estimating step S1010 includes the step S1011 of estimating path number L from received signal and the step S1012 of estimating current channel information $h_l$ for each path by using the estimated path number and the received pilot.

The channel information generating step S1020 includes the step S1021 of predicting channel information $\overline{SNR}$ after the minimum transmission delay time D by using the current channel information $h_l$ for each path by $$\hat{h}_l[n+D] = f(h_i[n], h_i[n-1], \ldots, h_i[n-P+1]),$$

$$\hat{p}_{biased} = \sum_{l=0}^{L-1} |\hat{h}_l|^2$$

and $\hat{p} = \hat{p}_{biased} + E\{p\} - E\{\hat{p}_{biased}\}$, and then creating and sending the short-period channel information based thereon to the base station; and the step S1022 of deriving a variance $E\{|SNR - \overline{SNR}|^2\}$ of error between the predicted channel information and actual channel information after the delay time, and then creating and reporting the variance and the path number L to the base station as the long-period channel information.

Figure 14:
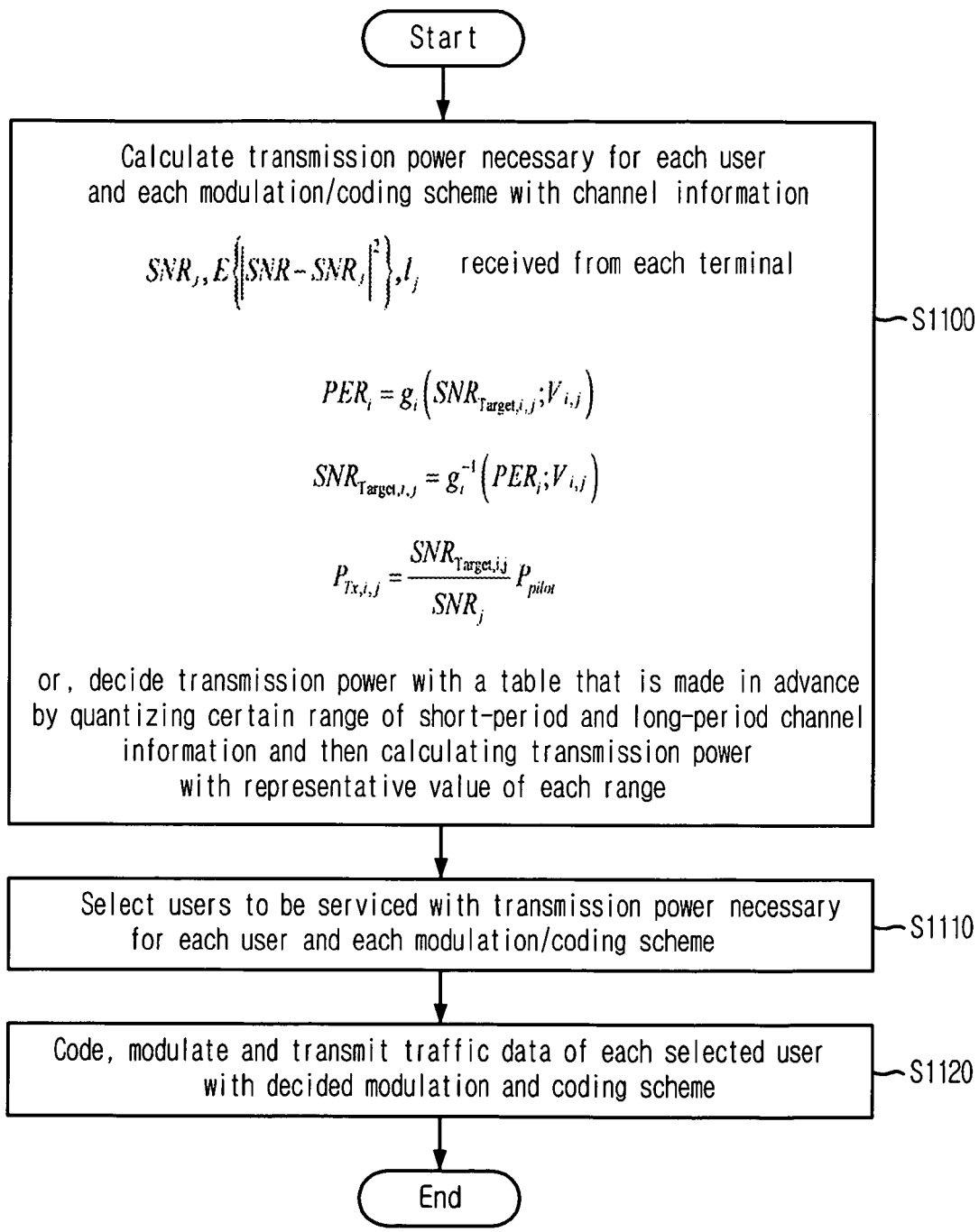
FIG. 14 is a flowchart showing a method for performing an adaptive transmission at the base station by using the short-period channel information and long-period channel information provided from each terminal in a mobile communication system using multi-carrier in accordance with an embodiment of the invention.

FIG. 14 is a flowchart showing a method for performing an adaptive transmission by using the short-period channel information and long-period channel information provided from each terminal at the base station in a mobile communication system using multi-carrier in accordance with an embodiment of the present invention.

First, a target average SNR and a target packet error rate for each modulating and each modulation and coding scheme are stored in a table form.

Next, at step S1100, a transmission power necessary for each user and each modulation and coding scheme is calculated by $$PER_i = g_i(SNR_{Target,i,j}; \overline{V}_{i,j}).\ SNR_{Target,i,j} = g_i^{-1}(PER_i; \overline{V}_{i,j}).\ P_{Tx,i,j} = \frac{SNR_{Target,i,j}}{\overline{SNR}_j} P_{pilot}$$

with $\overline{SNR}_j$, $E\{|SNR_j - \overline{SNR}_j|^2\}$, $l_j$. At this time, the stored target average SNR and target packet error rate for each modulation and coding scheme are employed. Or, there may be applied a method for deciding the transmission power from a table that is made in advance by quantizing a certain range of each channel information and then calculating a corresponding transmission power with representative value of each range.

At a following step S1110, users to be serviced are selected with the obtained transmission power necessary for each user and each modulation/coding scheme and then modulation and coding scheme for each user is decided.

Thereafter, traffic data of the selected users is coded and modulated with the decided modulation and coding scheme for transmission thereof at step S1120.

Figure 15:
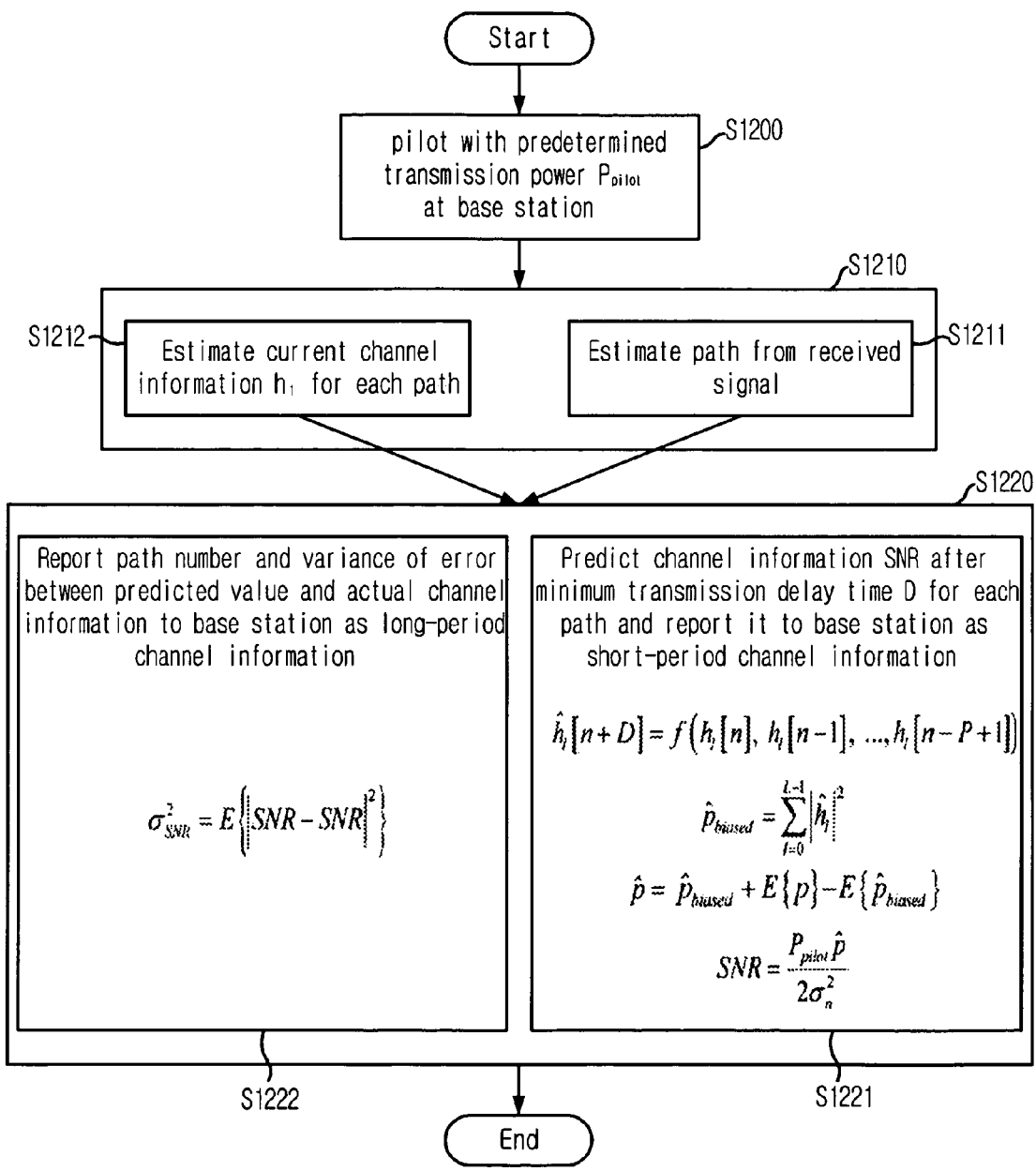
FIG. 15 is a flowchart showing a method for creating the short-period channel information and long-period channel information at each terminal in a mobile communication system using multi-carrier in accordance with another embodiment of the invention.

FIG. 15 is a flowchart showing a method for generating the short-period channel information and long-period channel information at each terminal in a mobile communication system using multi-carrier in accordance with another embodiment of the present invention.

First, when a transmission end sends a pilot with a predetermined transmission power $P_{pilot}$, a reception end receives it at step S1200.

Next, at the reception end, path and channel information are estimated through the received pilot at step S1210.

And then, using the estimated channel information, channel information after a predetermined minimum transmission delay time is predicted and sent or reported to a base station as short-period channel information. Also, path number and statistic information of error between the predicted channel information and actual channel information are obtained and reported to the base station as long-period channel information at step S1220.

More specifically, the estimating step S1210 includes the step S1211 of estimating path number L from received signal and the step S1212 of estimating current channel information $h_l$ for each path with the estimated path number and the received pilot.

The channel information generating step S1220 includes the step S1021 of predicting channel information $\overline{SNR}$ after the minimum transmission delay time D by using the current channel information $h_i$ for each path by $$\hat{h}_l[n+D] = \sum_{k=0}^{P-1} a_l[k] h_l[n-k],$$

$$\hat{p}_{biased} = \sum_{l=0}^{L-1} |\hat{h}_l|^2$$

and $\hat{p} = \hat{p}_{biased} + (E\{p\} - E\{\hat{p}_{biased}\})$, and then creating and reporting the short-period channel information based thereon to the base station; and the step S1222 of deriving a variance $E\{|SNR - \overline{SNR}|^2\}$ of error between the predicted channel information and actual channel information after the delay time, and then generating and reporting the variance and the path number L to the base station as the long-period channel information.

Figure 16:
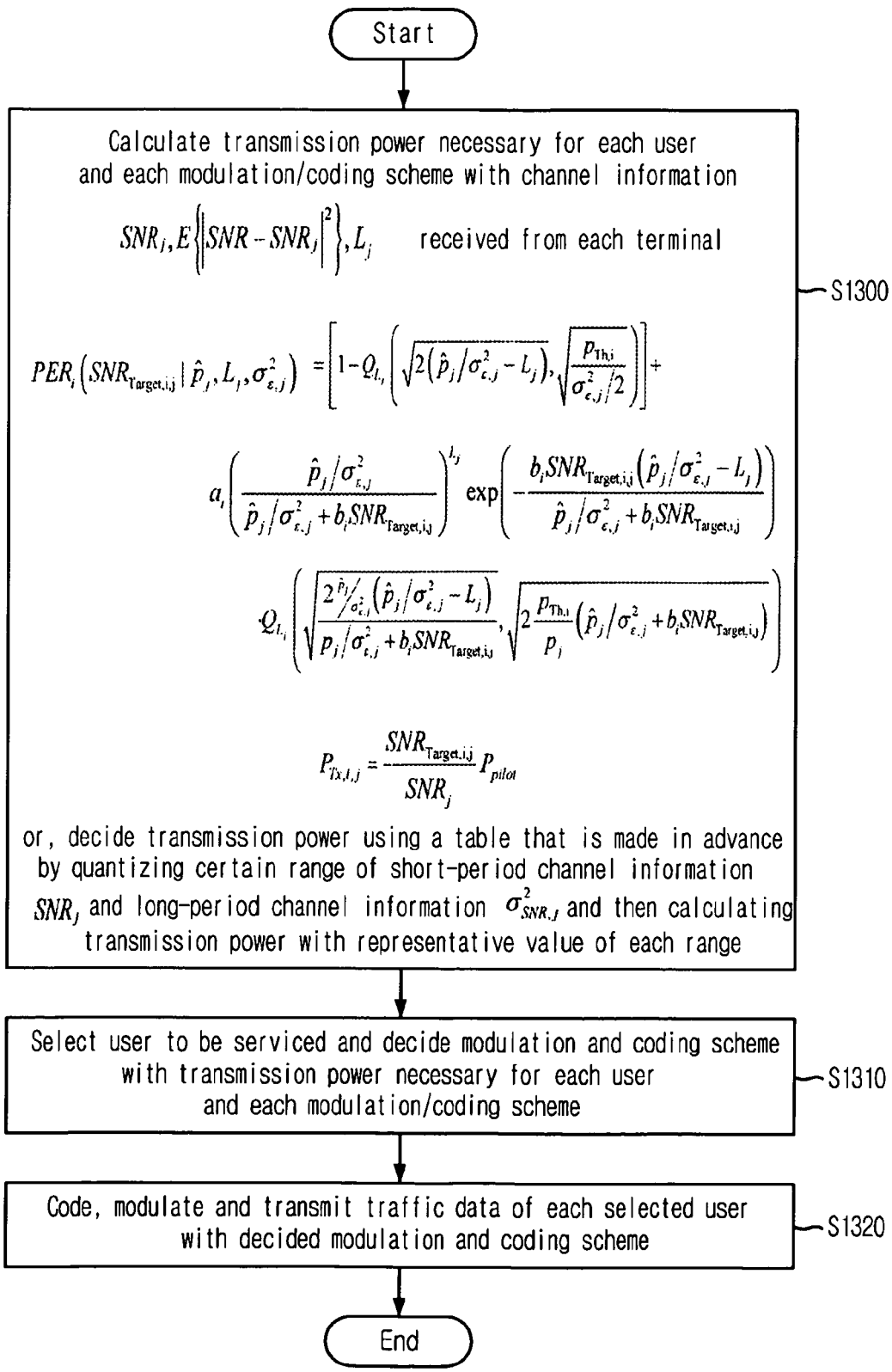
FIG. 16 shows a flowchart of a method for deciding modulation and coding scheme, user selection and transmission power and then performing an adaptive transmission based thereon at the base station when a mobile communication system using multi-carrier adopts a noncentral chi-square channel model in accordance with another embodiment of the invention.

FIG. 16 shows a flowchart of a method for deciding modulation and coding scheme, user selection and transmission power and then performing an adaptive transmission based thereon at a base station when a mobile communication system using multi-carrier adopts noncentral chi-square channel model in accordance with another embodiment of the invention. That is, it presents a flowchart of a method for calculating a transmission power for each modulation and coding scheme through a model using a noncentral chi-square distribution with the short-period channel information and the long-period channel information sent from each terminal, deciding modulation/coding scheme, user selection and transmission power using the transmission power, and then conducting an adaptive transmission based on the same at the base station.

First, a target average SNR and a target packet error rate for each modulation/coding scheme are stored in a table form.

Next, at step S1300, a transmission power necessary for each user and each modulation/coding scheme is calculated by Eqs. (8) and (15) to (18) above through the use of the binary search method and the channel information $\overline{SNR}_j$, $E\{|SNR_j - \overline{SNR}_j|^2\}$, $L_j$ from each terminal. For this, the stored target average SNR and target packet error rate for each modulation/coding scheme are used. Alternatively, there may be applied a method for deciding the transmission power using a table that is made in advance by quantizing a certain range of the short-period channel information $\overline{SNR}_j$ and the long-period channel information $\sigma_{SNR_j}^2$ and then calculating a corresponding transmission power with representative value of each range.

At a following step S1310, users to be serviced are selected with the obtained transmission power necessary for each user and each modulation/coding scheme and then modulation and coding scheme for each user is decided.

Subsequently, traffic data of the selected users is coded and modulated with the decided modulation and coding scheme for its transmission at step S1320.

Figure 17:
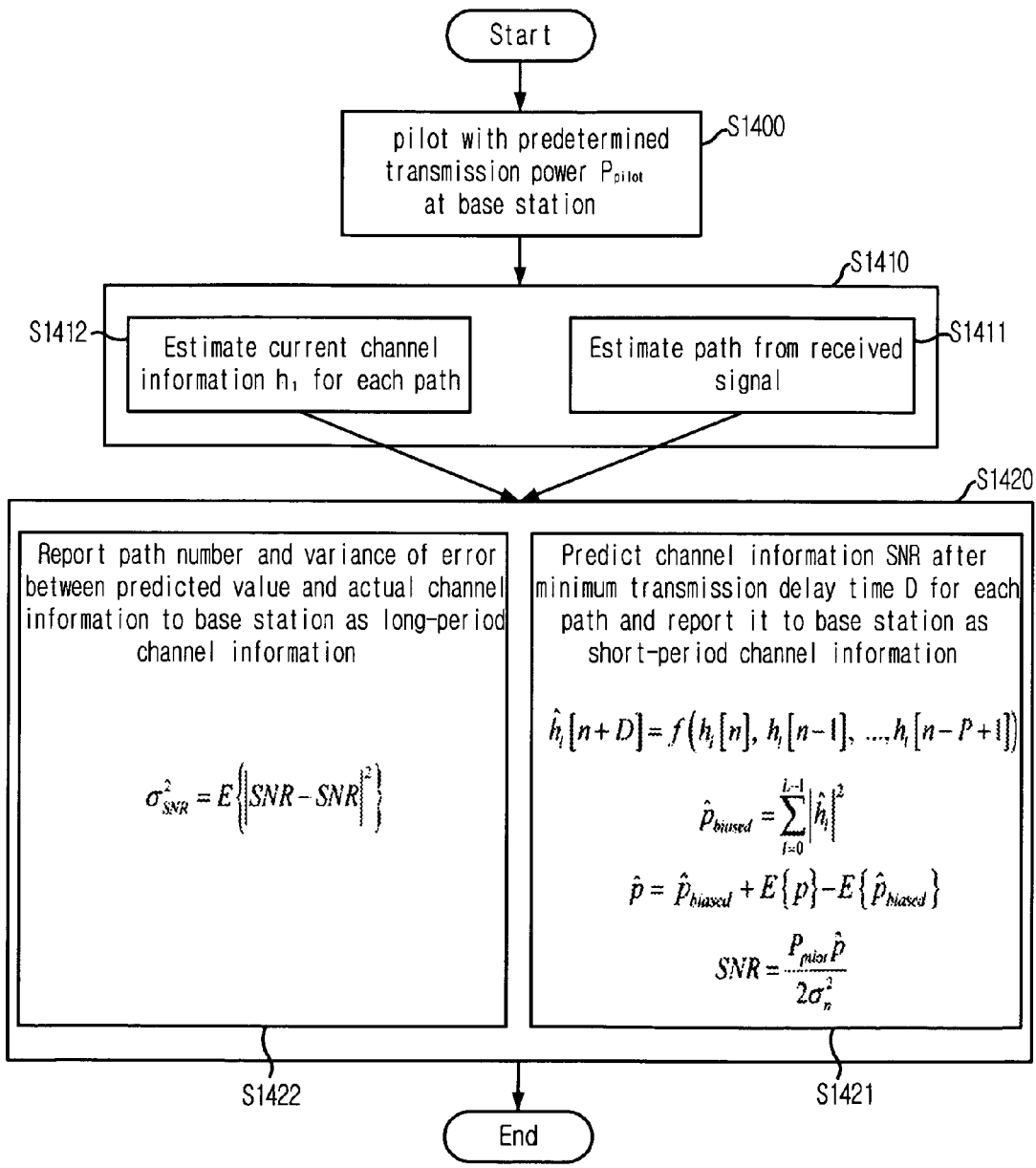
FIG. 17 is a flowchart showing a method for generating the short-period channel information and long-period channel information at each terminal in a mobile communication system using multi-carrier in accordance with another embodiment of the invention.

FIG. 17 is a flowchart showing a method for generating the short-period channel information and long-period channel information at each terminal in a mobile communication system using multi-carrier in accordance with another embodiment of the present invention, especially for creating the short-period channel information by predicting channel and the long-period channel information by using statistic value of the predicted channel, to be sent to the base station, at each terminal.

First, when a transmission end sends a pilot with a predetermined transmission power $P_{pilot}$, a reception end receives it at step S1400.

Next, at the reception end, path and channel information are estimated based on the received pilot at step S1410.

And then, using the estimated channel information, channel information after a predetermined minimum transmission delay time is predicted and sent or reported to a base station as short-period channel information. Also, path number and statistic information of error between the predicted channel information and actual channel information are obtained and reported to the base station as long-period channel information at step S1420.

Specifically, the estimating step S1410 includes the step S1411 of estimating path number L from received signal and the step S1412 of estimating current channel information $h_l$ for each path with the estimated path number and the received pilot.

The channel information generating step S1420 includes the step S1421 of predicting channel information $\overline{SNR}$ after the minimum transmission delay time D by using the current channel information $h_l$ for each path by $$\hat{h}_l[n+D] = \sum_{k=0}^{P-1} a_l[k] h_l[n-k], \quad \hat{p}_{biased} = \sum_{l=0}^{L-1} |\hat{h}_l|^2$$

and $\hat{p} = \hat{p}_{biased} + (E\{p\} - E\{\hat{p}_{biased}\})$, and then creating and reporting the short-period channel information based thereon to the base station; and the step S1422 of deriving a variance $E\{|SNR - \overline{SNR}|^2\}$ of error between the predicted channel information and actual channel information after the delay time, and then generating and reporting the variance and the path number L to the base station as the long-period channel information.

Figure 18:
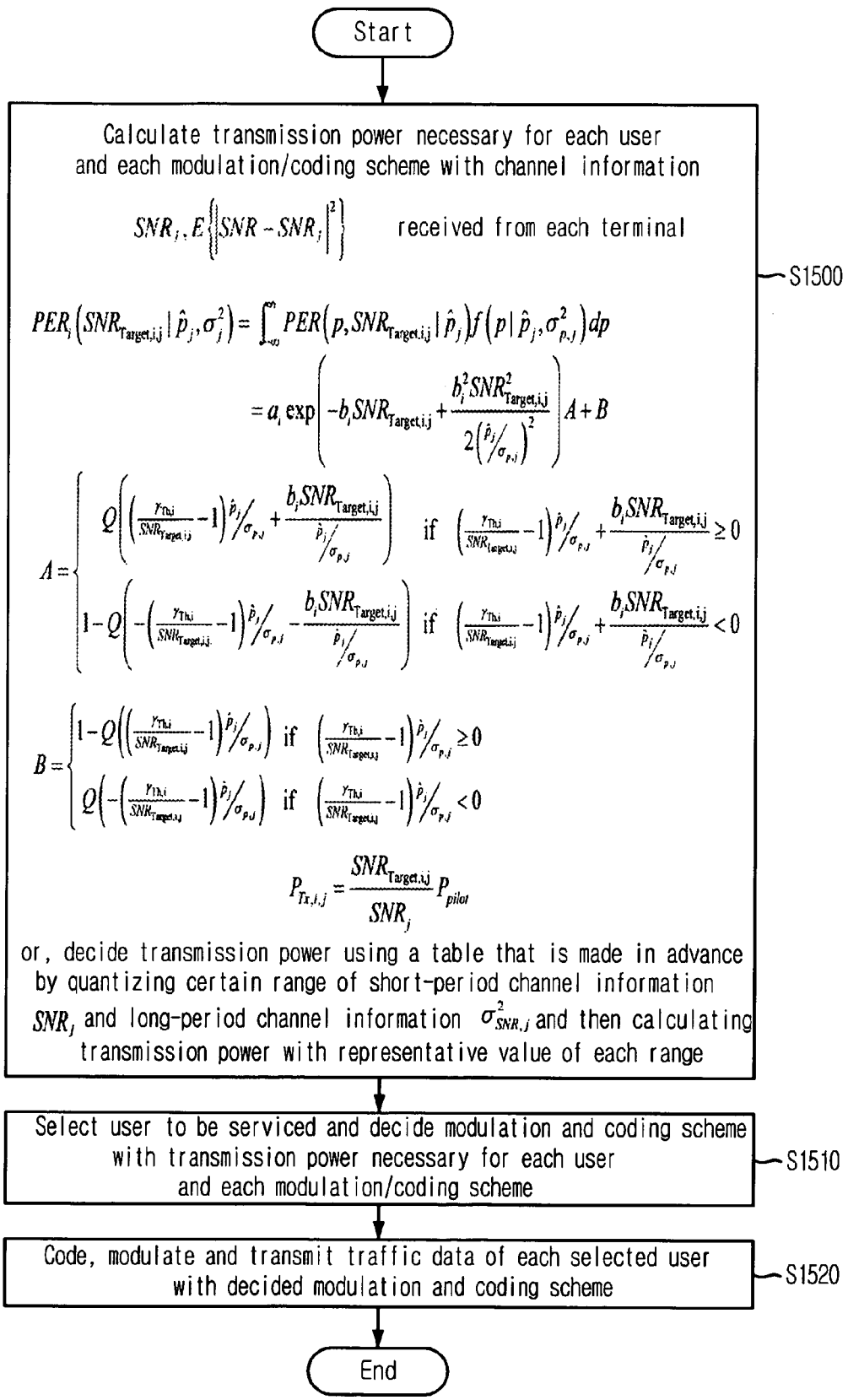
FIG. 18 shows a flowchart of a method for deciding modulation and coding scheme, user selection and transmission power and then performing an adaptive transmission based thereon at the base station when a mobile communication system using multi-carrier adopts a normal distribution channel model in accordance with another embodiment of the invention.

FIG. 18 shows a flowchart of a method for deciding modulation and coding scheme, user selection and transmission power and performing an adaptive transmission based thereon at a base station when a mobile communication system using multi-carrier adopts a normal distribution channel model in accordance with another embodiment of the invention. Especially, it provides a flowchart of a method for calculating a transmission power for each modulation and coding scheme through a model using a normal distribution with the short-period channel information and the long-period channel information from each terminal, deciding modulation and coding scheme, user selection and transmission power using the transmission power, and then conducting an adaptive transmission based on the same at the base station.

First, a target average SNR and a target packet error rate for each modulation and coding scheme are stored in a table form.

Next, at step S1500, a transmission power necessary for each user and each modulation and coding scheme is calculated by Eq. (20) above and $$P_{Tx,i,j} = \frac{SNR_{Target,i,j}}{SNR_j} P_{pilot}$$

by using the binary search method and the channel information $\overline{SNR}_j$, $E\{|SNR_j - \overline{SNR}_j|^2\}$, $L_j$ provided from each terminal. For this, the stored target average SNR and target packet error rate for each modulation and coding scheme are used. Alternatively, there may be applied a method for deciding the transmission power with a table that is structured in advance by quantizing a certain range of the short-period channel information $\overline{SNR}_j$ and the long-period channel information $\sigma_{SNR,j}^2$ and then calculating a corresponding transmission power with representative value of each range.

At a following step S1510, users to be serviced are chosen with the obtained transmission power necessary for each user and each modulation/coding scheme and then modulation and coding method for each user is decided.

Thereafter, traffic data of the selected users is modulated and coded with the decided modulation and coding scheme at step S1520.

Figure 19:
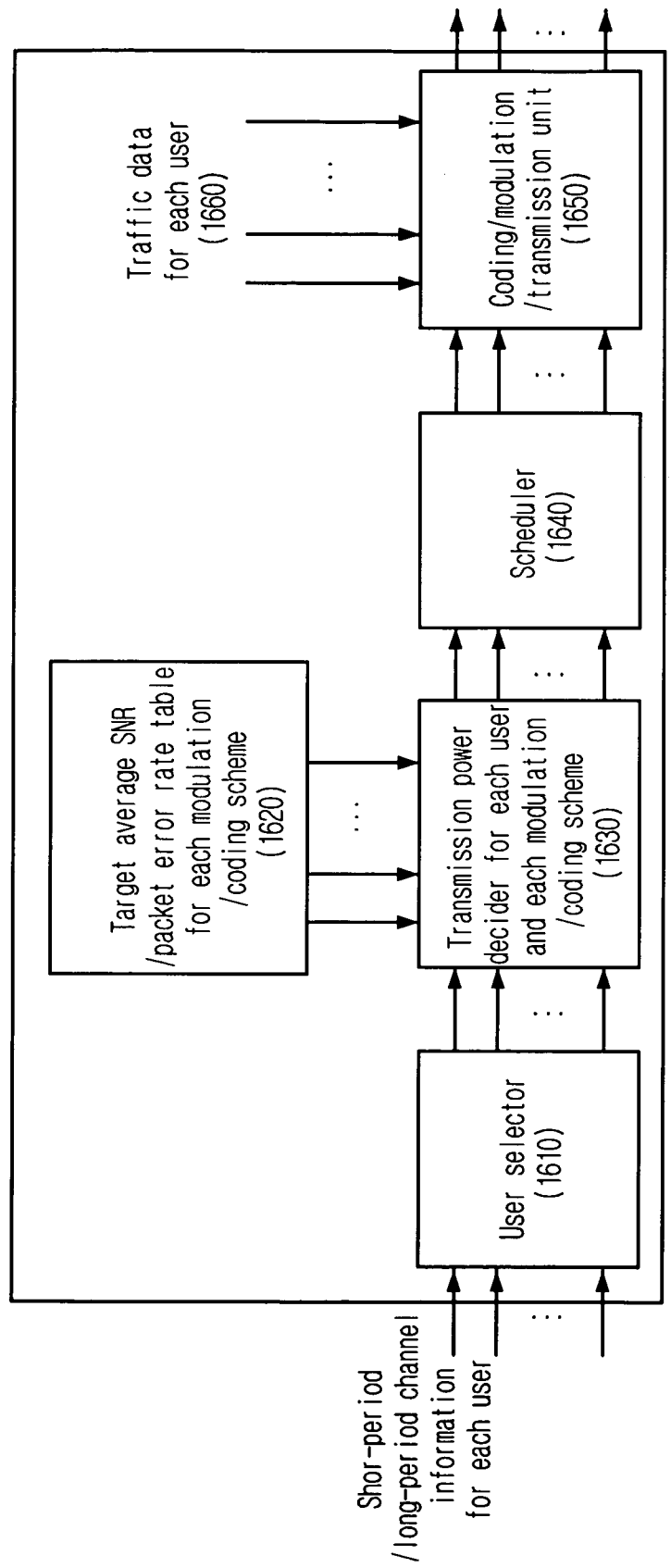
FIG. 19 shows a block diagram of an apparatus for first selecting user, deciding modulation and coding scheme and transmission power, and then performing an adaptive transmission based thereon at the base station in a mobile communication system using multi-carrier in accordance with another embodiment of the invention.

FIG. 19 shows a block diagram of an apparatus for performing an adaptive transmission by first selecting users and then deciding modulation and coding scheme and transmission power at a base station in a mobile communication system using multi-carrier in accordance with another embodiment of the present invention. In particular, it presents a block diagram of an apparatus for performing an adaptive transmission by first selecting users to be serviced and then deciding modulation/coding scheme and transmission power by means of calculating a transmission power for each modulation/coding scheme with the short-period channel information and long-period channel information from each terminal at the base station. This method first conducts the user selection and thus can reduce the amount of calculation at a transmission power decider 1630 for each user and each modulation/coding scheme. Specifically, users are first selected by priority of good channel circumstance based on the short-period channel information and the long-period channel information reported from each terminal at a user selector 1610. The fact that the short-period channel information $\overline{SNR}_j$ is large implies that channel circumstance is good. Therefore, the users can be selected in sequence of $\overline{SNR}_j$ with large value. But, this method may make its performance bad since the user with large error variance may have a high probability that the difference between the predicted value and the actual value is large where variances of errors of predicted values for each user are different from one another. Accordingly, the users are selected by taking into account all of the value $\hat{p}_j$ that is proportional to the short-period channel information $$SNR_j = \frac{P_{pilot}\hat{p}_j}{\sigma_n^2}$$

and the value $\sigma_{p,j}$ that is proportional to a square root the long-period channel information $$\sigma_{SNR,j}^2 = \left(\frac{P_{pilot}\sigma_{p,j}}{\sigma_n^2}\right)^2.$$

More specifically, in order to reflect the different variances for each user, the users may be chosen in sequence of $\hat{p}_j/\sigma_j$ with large value among values which are obtained by dividing the short-period channel information by a square root of the long-period channel information. And also, the users may be selected in order of $\hat{p}_j - k\sigma_{p,j}$ with large value for a preset value k.

Meanwhile, a target average SNR and a target packet error rate for each modulation/coding scheme are stored in a target average SNR and packet error rate table 1620 for each modulation and coding mode and then delivered to a transmission power decider 1630 for each user and each modulation/coding scheme. And at the transmission power decider 1630 for each user and each modulation/coding scheme, a target SNR is obtained in line with a target packet error rate for each modulation and coding scheme with the short-period channel information and the long-period channel information for each user selected at the user selector 1610 to derive a required transmission power. This may be obtained by using a scheme that is modeled by the noncentral chi-square distribution as mentioned in Eq. (15) above or by the normal distribution in Eq. (20) above. Then, the SNR can be computed with the binary search method as exampled above. Alternatively, there may be adopted a method for deciding the transmission power with a table that is constructed in advance by quantizing a certain range of the short-period channel information $\overline{S}NR_j$ and the long-period channel information $\sigma_{SNR,j}^2$ and then calculating a corresponding transmission power with representative value of each range.

Thereafter, at a scheduler 1640, modulation and coding scheme for each user selected at the user selector 1610 is decided with the transmission power necessary for each user and each modulation/coding scheme obtained at the transmission power decider 1630 for each user and each modulation/coding scheme. And at a coding/modulation/transmission unit 1650, traffic data 1660 for each user is coded with the coding scheme decided for each user selected at the user selector 1610; and then coded/modulated with the coding/modulation scheme decided at the scheduler 1640 and sent to the terminal.

Figure 20:
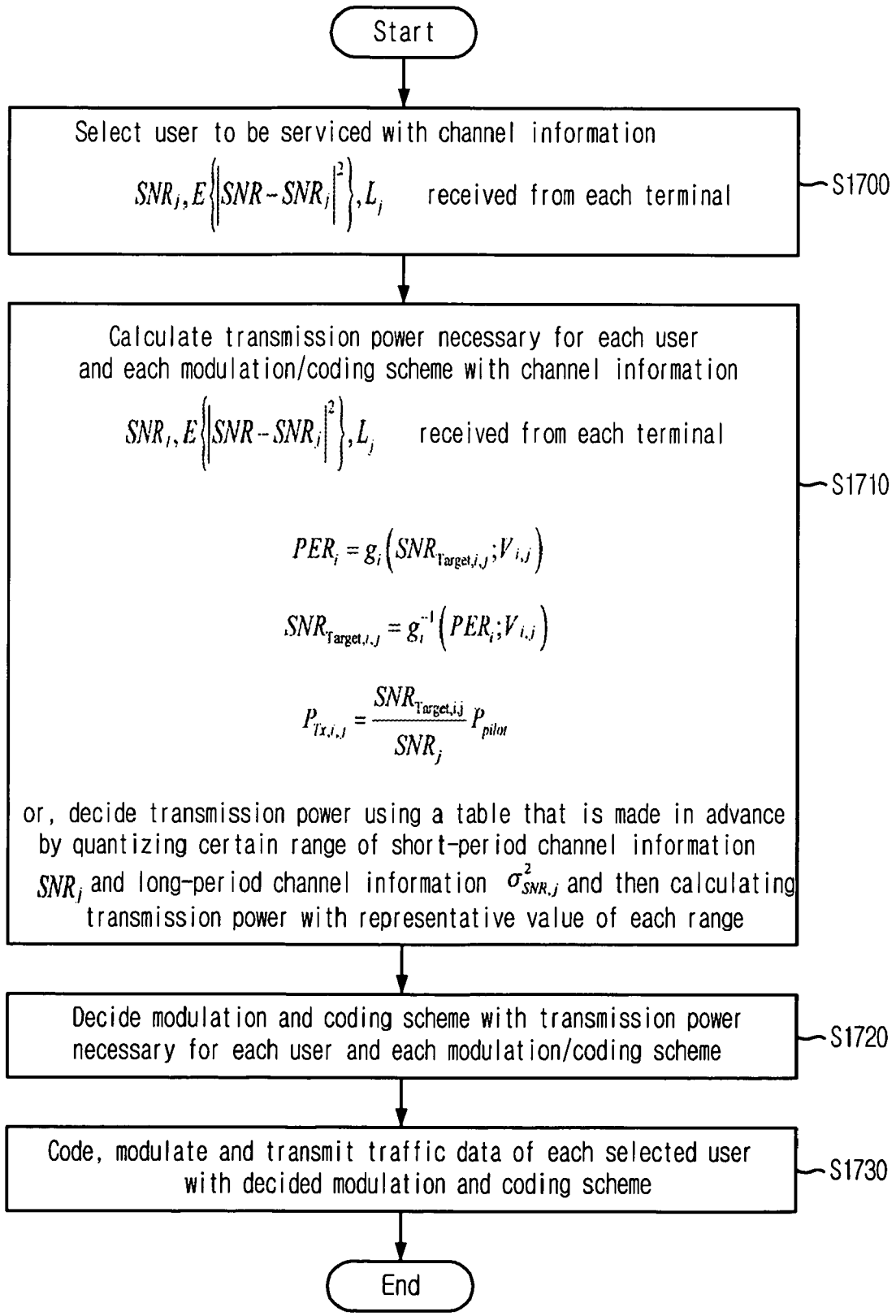
FIG. 20 shows a flowchart of a method for first selecting user, deciding modulation and coding scheme and transmission power, and then performing an adaptive transmission based thereon at the base station in a mobile communication system using multi-carrier in accordance with another embodiment of the present invention.

FIG. 20 shows a flowchart of a method for performing an adaptive transmission by first selecting users and then deciding modulation and coding scheme and transmission power at a base station in a mobile communication system using multi-carrier in accordance with another embodiment of the present invention. Namely, it offers a flowchart of a method for performing an adaptive transmission by first selecting users to be serviced and then deciding modulation and coding scheme and transmission power with the short-period channel information and long-period channel information from each terminal by means of calculating a transmission power for each modulation and coding scheme at the base station.

First, a target average SNR and a target packet error rate for each modulation/coding scheme are stored in table form.

In the method that selects users using only $\overline{S}NR_j$ predicted at each terminal, its performance may be aggravated since the user with large error variance may have a high probability that the difference between the predicted value and the actual value is large where variances of errors of predicted values for each user are different from one another. Accordingly, the users are selected by taking into account all of the value $\hat{p}_j$ that is proportional to the short-period channel information $$SNR_j = \frac{P_{pilot}\hat{p}_j}{\sigma_n^2}$$

and the value $\sigma_{p,j}$ that is proportional to a square root of the long-period channel information $$\sigma_{SNR,j}^2 = \left(\frac{P_{pilot}\sigma_{p,j}}{\sigma_n^2}\right)^2$$

at step S1700.

Next, at step S1710, a transmission power $$P_{Tx,i,j} = \frac{SNR_{Target,i,j}}{\overline{S}NR_j} P_{pilot}$$

necessary for each modulation and coding scheme is calculated with the channel information $\overline{S}NR_j$, $E\{|SNR_j - \overline{S}NR_j|^2\}$, $L_j$ for each of the selected users. Or, there may be applied a method for deciding the transmission power using a table that is constructed in advance by quantizing a certain range of the short-period channel information $\overline{S}NR_j$ and the long-period channel information $\sigma_{SNR,j}^2$ and then calculating a corresponding transmission power with representative value of each range.

At a following step S1720, modulation and coding scheme for each user is decided based on the transmission power obtained for each user and each modulation/coding scheme.

Thereafter, traffic data of the selected users is modulated and coded with the decided modulation and coding scheme and then sent at step S1730.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present invention can efficiently perform an adaptive transmission with small information amount by feeding back only channel value at the time of future transmission predicted to use an adaptive transmission scheme, variance of error of the predicted value and path number in mobile communication systems using frequency division multiplexing.

Especially, the invention can improve the performance and capacity of mobile communication system by enabling an adaptive transmission by means of obtaining an optimal modulation and coding scheme and a power necessary for the transmission through a good prediction of reception performance using only a small amount of feedback information in systems using multi-carrier.

In addition, the invention can be applied to examples of using a normal distribution model, under any circumstance, regardless of channel model.

Namely, the invention can enable an adaptive transmission in mobile communication systems that are under various channel environments, and combine with terminals using various channel information generation algorithms and various mobile objects' speeds.

The present application contains subject matter related to Korean patent application Nos. 2005-0076504 and 2005-0123940, filed with the Korean Intellectual Property Office on Aug. 19, 2005, and Dec. 15, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for generating channel information at a terminal wirelessly communicable with a base station in a mobile communication system, said apparatus comprising:
   an estimation means for estimating, for each path, current channel information of a multi-carrier signal received by the terminal from the base station;
   a short-period channel information generation means for predicting channel information after a predetermined minimum transmission delay time based on the current channel information estimated by the estimation means to generate short-period channel information;
   a long-period channel information generation means for deriving statistic information of an error between the channel information predicted by the short-period channel information generation means and actual channel information at the time of transmission to produce long-period channel information; and
   a transmission means for feeding back the short period channel information and the long period channel information to the base station, to enable the base station to decide a modulation/coding scheme for traffic data to be transmitted to said terminal;
   wherein the channel information after the predetermined minimum transmission delay time for each path and each carrier is predicted by using the estimated current channel information as follows:

$\hat{h}_l[n+D] = f(h_l[n], h_l[n-1], \ldots, h_l[n-P+1])$ where $h_l[n]$ indicates a channel of complex form at a time n of the $l^{th}$ path, P denotes a degree of predictor and f represents a prediction filter, D is the predetermined minimum transmission delay time.

2. The apparatus as recited in claim 1, wherein the short-period channel information generation means
   predicts channel information after the predetermined minimum transmission delay time using the current channel information estimated by the estimation means,
   derives a reception power of the received multi-carrier signal based on the channel information, and
   calculates a power by removing bias components from the reception power.

3. The apparatus as recited in claim 2, wherein the short-period channel information generation means produces a Signal to Noise Ratio (SNR), which is proportional to the power obtained by removing the bias components from the reception power, as the short-period channel information.

4. The apparatus as recited in claim 3, wherein the long-period channel information generation means
   derives a variance of error between the SNR predicted by the short-period channel information generation means and an SNR at the time of actual transmission after a predetermined time, and
   provides the variance as the long-period channel information.

5. The apparatus as recited in claim 1, wherein
   the estimation means estimates a total number of paths from the received multi-carrier signal, and
   the long-period channel information generation means reports the total number of paths from the estimation means to the base station as the long-period channel information.

6. A method of generating channel information by a terminal wirelessly communicable with a base station in a mobile communication system, said method comprising the steps of:
   (a) receiving a pilot transmitted from the base station;
   (b) estimating, for each path, current channel information using the received pilot;
   (c) predicting channel information after a predetermined minimum transmission delay time based on the estimated current channel information to generate short-period channel information;
   (d) deriving statistic information of an error between the predicted channel information and actual channel information at the time of transmission to produce long-period channel information; and
   (e) feeding back the short period channel information and the long period channel information to the base station, to enable the base station to decide a modulation/coding scheme for traffic data to be transmitted to said terminal,
   wherein the channel information after the predetermined minimum transmission delay time for each path and each carrier is predicted by using the estimated current channel information as follows:

$\hat{h}_l[n+D] = f(h_l[n], h_l[n-1], \ldots, h_l[n-P+1])$ where kW indicates a channel of complex form at a time n of the $l^{th}$ path, P denotes a degree of predictor and f represents a prediction filter, D is the predetermined minimum transmission delay time.

7. The method as recited in claim 6, wherein the step (c) comprises:
   predicting channel information after the predetermined minimum transmission delay time using the estimated current channel information,
   deriving a reception power of the received pilot based on the predicted channel information, and
   calculating a power by removing bias components from the reception power.

8. The method as recited in claim 7, wherein the step (c) further comprises:
   generating a Signal to Noise Ratio (SNRT), which is proportional to the power obtained by removing the bias component components from the reception power, as the short-period channel information.

9. The method as recited in claim 8, wherein the step (d) comprises:
   deriving a variance of error between the SNR generated at the step (c) and an SNR at the time of actual transmission after a predetermined time, and
   reporting the variance to the base station as the long-period channel information.

10. The method as recited in claim 6, wherein
    the step (b) comprises estimating a total number of paths from the received pilot, and
    the step (d) comprises reporting the total number of paths estimated at the step (e) to the base station as the long-period channel information.

* * * * *